US008847132B2

(12) United States Patent
Russell et al.

(10) Patent No.: US 8,847,132 B2
(45) Date of Patent: Sep. 30, 2014

(54) SUSCEPTORS CAPABLE OF BALANCING STRESS AND EFFECTIVENESS

(75) Inventors: Anthony Russell, Rockwood (CA); Lorin R. Cole, Larsen, WI (US); Scott W. Middleton, Oshkosh, WI (US)

(73) Assignee: Graphic Packaging International, Inc., Atlanta, GA (US)

( * ) Notice: Subject to any disclaimer, the term of this patent is extended or adjusted under 35 U.S.C. 154(b) by 79 days.

(21) Appl. No.: 13/286,724

(22) Filed: Nov. 1, 2011

(65) Prior Publication Data

US 2012/0043317 A1     Feb. 23, 2012

Related U.S. Application Data

(60) Continuation of application No. 12/321,114, filed on Jan. 14, 2009, now abandoned, which is a division of application No. 11/454,273, filed on Jun. 16, 2006, now abandoned.

(60) Provisional application No. 60/691,885, filed on Jun. 17, 2005.

(51) Int. Cl.
| H05B 6/80 | (2006.01) |
| H05B 6/64 | (2006.01) |
| A23L 1/216 | (2006.01) |
| B65D 81/34 | (2006.01) |

(52) U.S. Cl.
CPC .... *B65D 81/3446* (2013.01); *B65D 2581/3454* (2013.01); *B65D 2581/3498* (2013.01); *B65D 2581/3494* (2013.01); *B65D 2581/3452* (2013.01); *B65D 2581/344* (2013.01); *B65D 2581/3472* (2013.01)
USPC ............ 219/730; 219/759; 219/732; 426/637

(58) Field of Classification Search
CPC ..... A23L 1/005; A23L 1/0055; A23L 1/0128; A23L 1/2163; A23L 1/217; B65D 5/545; B65D 81/3453; B65D 2581/3498; B65D 2581/3413; B65D 2581/3495

USPC ................ 219/730, 732–736, 745, 759, 762; 99/DIG. 14; 426/107, 118, 234, 241, 426/243, 113, 121
See application file for complete search history.

(56) References Cited

U.S. PATENT DOCUMENTS

| 3,302,632 A | 2/1967 | Fichtner |
| 3,547,661 A | 12/1970 | Stevenson |

(Continued)

FOREIGN PATENT DOCUMENTS

| EP | 0 317 203 A1 | 5/1989 |
| EP | 0 336 325 A2 | 10/1989 |

(Continued)

OTHER PUBLICATIONS

Notice of Allowance and Fee(s) Due dated May 1, 2012 for U.S. Appl. No. 12/383,482.

(Continued)

*Primary Examiner* — Quang Van
(74) *Attorney, Agent, or Firm* — Womble Carlyle Sandridge & Rice, LLP

(57) ABSTRACT

An outer portion of one or more layers of microwave interactive material, which is for becoming hot when exposed to microwave energy, is arranged in a manner that seeks to advantageously control heating, so that the outer portion of the microwave interactive material can safely be adjacent the periphery of a turntable tray. The turntable tray can be heated by the microwave interactive material so that a peak thermally induced stress occurs in the turntable tray at a position proximate the periphery of the tray. The layer(s) of microwave interactive material are configured in a manner so that the peak thermally induced stress is less than a predetermined amount.

14 Claims, 17 Drawing Sheets

(56) References Cited

U.S. PATENT DOCUMENTS

| | | |
|---|---|---|
| 3,662,139 A | 5/1972 | Love |
| 3,865,301 A | 2/1975 | Pothier et al. |
| 3,936,626 A | 2/1976 | Moore |
| 4,013,798 A | 3/1977 | Goltsos |
| 4,020,310 A | 4/1977 | Souder, Jr. et al. |
| 4,398,994 A | 8/1983 | Beckett |
| 4,552,614 A | 11/1985 | Beckett |
| 4,558,198 A | 12/1985 | Levendusky et al. |
| 4,676,857 A | 6/1987 | Scharr et al. |
| 4,865,921 A | 9/1989 | Hollenberg et al. |
| 4,883,936 A | 11/1989 | Maynard et al. |
| 4,890,439 A | 1/1990 | Smart et al. |
| 4,896,009 A | 1/1990 | Pawlowski |
| 4,908,246 A | 3/1990 | Fredricks et al. |
| 4,927,991 A | 5/1990 | Wendt et al. |
| 4,959,120 A | 9/1990 | Wilson |
| 4,970,358 A * | 11/1990 | Brandberg et al. ........... 219/759 |
| 4,972,059 A | 11/1990 | Wendt et al. |
| 5,038,009 A | 8/1991 | Babbitt |
| 5,079,397 A | 1/1992 | Keefer |
| 5,117,078 A | 5/1992 | Beckett |
| 5,149,396 A | 9/1992 | Wilson |
| 5,177,332 A | 1/1993 | Fong |
| 5,213,902 A | 5/1993 | Beckett |
| 5,220,143 A | 6/1993 | Kemske et al. |
| 5,239,153 A | 8/1993 | Beckett |
| 5,254,821 A | 10/1993 | Walters |
| 5,260,537 A | 11/1993 | Beckett |
| 5,278,378 A | 1/1994 | Beckett |
| RE34,683 E | 8/1994 | Maynard et al. |
| 5,352,465 A | 10/1994 | Gondek et al. |
| 5,354,973 A | 10/1994 | Beckett |
| 5,391,864 A | 2/1995 | Bodor et al. |
| 5,410,135 A | 4/1995 | Pollart et al. |
| 5,424,517 A | 6/1995 | Habeger, Jr. et al. |
| 5,466,917 A | 11/1995 | Matsuki et al. |
| 5,519,195 A | 5/1996 | Keefer et al. |
| 5,530,231 A | 6/1996 | Walters et al. |
| 5,585,027 A | 12/1996 | Young |
| 5,698,127 A | 12/1997 | Lai et al. |
| 5,759,422 A | 6/1998 | Schmelzer et al. |
| 5,800,724 A | 9/1998 | Habeger et al. |
| 5,864,123 A | 1/1999 | Keefer |
| 6,114,679 A | 9/2000 | Lai et al. |
| 6,133,560 A | 10/2000 | Zeng et al. |
| 6,150,646 A | 11/2000 | Lai et al. |
| 6,251,451 B1 | 6/2001 | Zeng |
| 6,414,290 B1 | 7/2002 | Cole et al. |
| 6,433,322 B2 | 8/2002 | Zeng et al. |
| 6,677,563 B2 | 1/2004 | Lai |
| 6,717,121 B2 | 4/2004 | Zeng et al. |
| 6,765,182 B2 | 7/2004 | Cole et al. |
| 7,019,271 B2 | 3/2006 | Wnek |
| 7,022,959 B2 | 4/2006 | Cole |
| 7,351,942 B2 * | 4/2008 | Wnek et al. ................ 219/730 |
| 2003/0085223 A1 | 5/2003 | Zeng et al. |
| 2004/0238535 A1 | 12/2004 | Mast |
| 2005/0042360 A1 * | 2/2005 | Tiffany et al. ................ 426/637 |
| 2005/0184066 A1 | 8/2005 | Brooks et al. |
| 2006/0049190 A1 | 3/2006 | Middleton |
| 2006/0138128 A1 | 6/2006 | Cole |
| 2006/0289522 A1 | 12/2006 | Middleton et al. |
| 2007/0023426 A1 | 2/2007 | Russell |
| 2009/0184111 A1 | 7/2009 | Russell |
| 2009/0246332 A1 | 10/2009 | Lai et al. |

FOREIGN PATENT DOCUMENTS

| | | |
|---|---|---|
| GB | 2 280 342 A | 1/1995 |
| WO | WO 89/11772 | 11/1989 |
| WO | WO 93/09945 | 5/1993 |
| WO | WO 98/08752 | 3/1998 |
| WO | WO 98/35887 | 8/1998 |
| WO | WO 01/23275 | 4/2001 |
| WO | WO 03/066435 | 8/2003 |
| WO | WO 06/138645 | 12/2006 |

OTHER PUBLICATIONS

International Search Report—PCT/US2006/023617.
Written Opinion—PCT/US2006/023617.
European Search Report for corresponding European Application No. EP 12008247, completed Jul. 12, 2013.

* cited by examiner

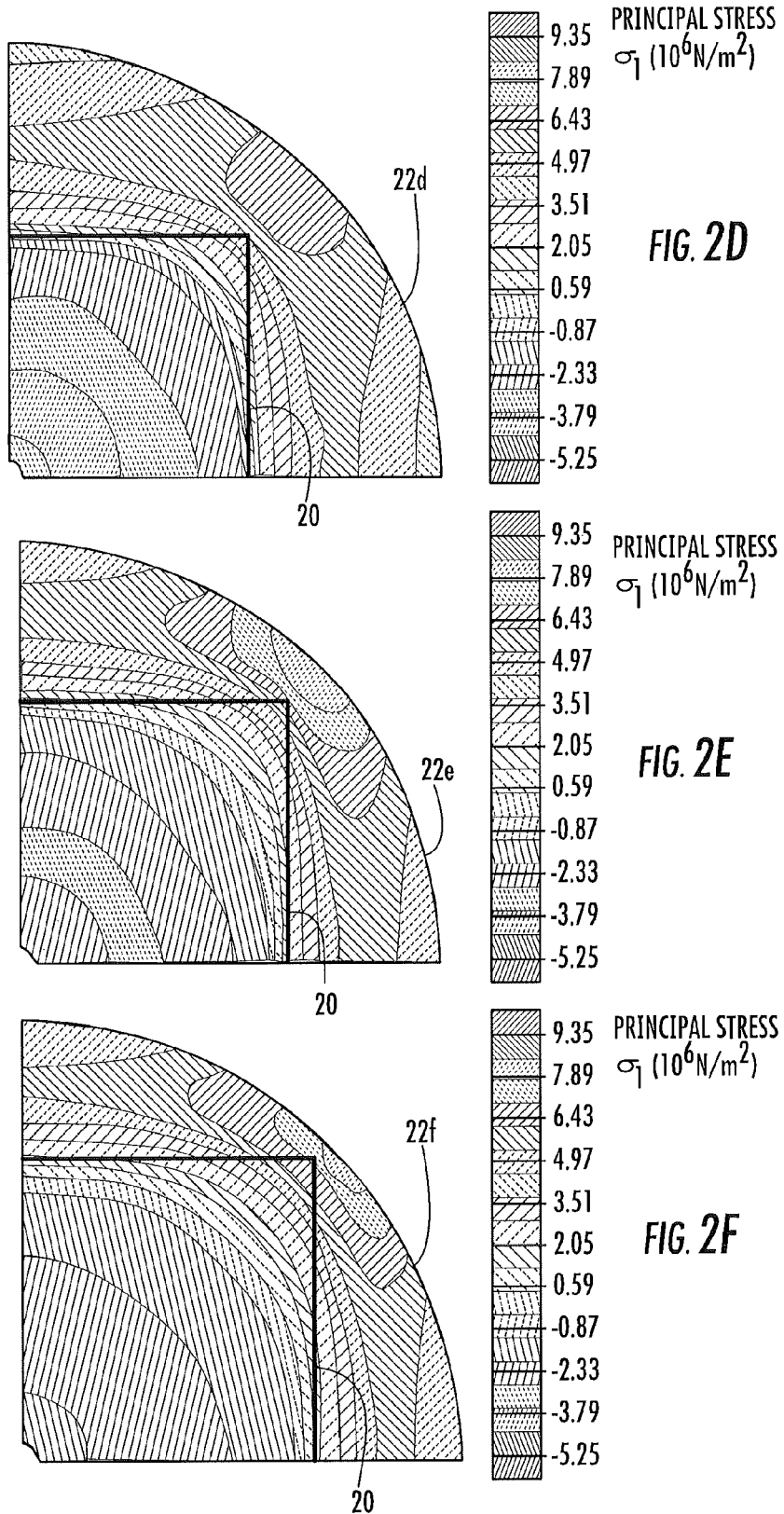

SUSCEPTORS CAPABLE OF BALANCING STRESS AND EFFECTIVENESS

CROSS-REFERENCE TO RELATED APPLICATIONS

This application is a continuation of U.S. patent application Ser. No. 12/321,114, filed Jan. 14, 2009, which is a divisional of U.S. patent application Ser. No. 11/454,273, filed Jun. 16, 2006, which claims the benefit of U.S. Provisional Application No. 60/691,885, filed Jun. 17, 200; and the disclosures of all of the above-referenced application are incorporated by reference herein in their entirety.

BACKGROUND OF THE INVENTION

The present invention generally relates to microwave energy interactive materials ("microwave interactive materials") and, more specifically, to the shape of susceptors.

Microwave ovens are frequently used to heat food. As a result, the number of food items and constructs (e.g., packages) available for use with a microwave oven is increasing. It is well known for such a construct to include a layer of microwave energy interactive material ("microwave interactive material") that is for interacting with microwave energy in a manner that reduces, enhances or otherwise alters the effectiveness of a microwave oven. There are several types of microwave interactive materials that have been used, including, but not limited to, susceptors and shields. Susceptors predominantly absorb microwave energy and thereby become hot, so that susceptors can be used to heat, brown and/or crisp at least a portion of an adjacent food item, such as through radiant heat transfer. In contrast, shields predominantly reflect microwave energy, so that shields can be used to direct microwave energy away from a portion of an associated food item to thereby restrict heating.

Shields are typically made of aluminum foil that is relatively thick as compared to the layer of microwave interactive material of a susceptor; therefore, shields typically have greater electrical conductivity than susceptors. As a result of the relatively high electrical conductivity, electrical arcing can occur at any pointed corners of a shield that is being exposed to microwave energy. In order to avoid this problem, it is common for shields to include rounded corners. In contrast, because of the relatively low electrical conductivity of susceptors, arcing typically does not occur at pointed corners of susceptors used in microwave ovens. Therefore, susceptors typically have pointed corners.

A typical susceptor includes a layer of microwave interactive material (e.g., a metal) secured to or supported on a support layer (e.g., paper or a polymeric film). A construct (e.g., a tray with an upright peripheral rim, flat tray, sleeve, wrap, carton or bag, such as for popping popcorn) that is for supporting food being cooked in a microwave oven often includes a bottom that includes a susceptor.

In an effort to promote uniform cooking, some microwave ovens include a turntable that has a rotatable disk-shaped tray (i.e., a tray that is at least generally round). A construct is typically upon the rotating disk-shaped tray during cooking, so that the lower surface of the construct's bottom is in opposing face-to-face contact with the upper surface of the turntable tray. The upper surface of the construct's bottom typically can include a susceptor, so that the susceptor is adjacent the food carried by (e.g., contained by) the construct. The susceptor absorbs microwave energy and becomes hot, such as for heating, browning, and/or crisping the food adjacent thereto. Depending upon the insulating characteristics of the construct's bottom, some of the heat provided by the hot susceptor may be transferred to the turntable tray. In particular, corners of the susceptor may be proximate the periphery of the turntable tray, and heat transferred from those corners of the susceptor to the turntable tray can lead to damaging thermally induced stress in the turntable tray, namely proximate the periphery of the turntable tray. This stress can result, for example, in the breaking of the turntable tray, as will be discussed in greater detail below.

FIG. 1 is a schematic top plan view of a bottom panel 20 of a prior art package that is upon a turntable tray 22. All of the turntable trays 22 referred to in this specification are conventional, made of glass (e.g., Pyrex brand glass), ceramic or the like, and are for use in a microwave oven (not shown). The lower surface of the bottom panel 20 is in opposing face-to-face contact with the upper surface of the turntable tray 22. The entirety of the upper surface of the bottom panel 20 is covered with a continuous layer of microwave interactive material. The continuous layer of microwave interactive material is schematically represented by stippling in FIG. 1. The microwave interactive material is operative for becoming hot when exposed to microwave energy. The enhanced heating rate of the microwave interactive material causes the center of the turntable tray 22 (i.e., those portions of the turntable tray that are covered by the bottom panel 20 and, therefore, the microwave interactive material) to heat faster than the outer areas of the turntable tray (i.e., those portions of the turntable tray that are not covered by the bottom panel 20). Accordingly, the turntable tray 22 can be characterized as having a hot center that is being constrained by a relatively cooler perimeter, so that the center of the turntable tray 22 is in compression and the perimeter of the turntable tray 22 is in tension.

The bottom panel 20 illustrated in FIG. 1 is also schematically illustrative of a susceptor (e.g., a susceptor patch) in isolation, with the support layer of the susceptor (support layers of susceptors are discussed in greater detail below with reference to FIG. 3C) corresponding in shape and size to the bottom panel, and the support layer being entirely covered with a continuous layer of microwave interactive material. The dashed lines in FIG. 1 designate a quadrant of the susceptor/bottom panel 20.

FIGS. 2A-G are schematic illustrations that respectively show theoretical thermally induced stress in turntable trays 22a-g of different sizes. Each of these figures schematically shows the location of a quadrant of the susceptor 20 (FIG. 1) upon a quadrant of the respective turntable tray 22a-g, and the susceptor is centered on the trays. The relatively dark, perpendicular lines in FIGS. 2A-G represent the periphery of the quadrant of the susceptor 20. The contrasting crosshatching in FIGS. 2A-G is illustrative of theoretical thermally induced stress in the turntable trays 22a-g. Each of these figures includes a legend for providing an understanding of how the contrasting crosshatching is illustrative of the stress. The illustrated thermally induced stress is the result of the susceptor 20 being upon the turntable trays 22a-g, and the microwave interactive material of the susceptor 20 absorbing microwave energy and thereby becoming hot and heating the turntable trays 22a-g.

As apparent from FIGS. 2A-G, with the susceptor 20 centered, the relatively large diameter turntable trays have a peak thermally induced stress that is located inwardly from the perimeters of the turntable trays; and in contrast, the relatively small diameter turntable trays have a peak thermally induced stress that is located at, or proximate, the perimeters of the turntable trays.

It is been suggested that some consumers have a habit of placing relatively small packages with susceptors off-center on relatively large turntable trays in microwave ovens, because they believe that this arrangement enhances cooking. Even a relatively small susceptor that is sufficiently off-center on a relatively large turntable tray can cause the peak thermally induced stress to be disadvantageously located at, or proximate, the perimeter of the turntable tray.

It can be disadvantageous to have peak thermally induced stress that is located at, or proximate, the perimeters of turntable trays. For example, fractures and cracks tend to initiate at the edges of turntable trays because stress-enhancing defects, such as chips, are common at the edges of turntable trays. Bringing stress-enhancing defects and the peak thermally induced stresses together increases the possibility of fracturing turntable trays made of glass, and the like.

Accordingly, it is desirable for susceptors to function in a manner that seeks to keep peek thermally induced stress away from the perimeters of the turntable trays. At the same time, it is desirable to optimize the heating effectiveness of susceptors. Therefore, it is desirable to provide susceptors and other constructs that provide a new balance of properties.

SUMMARY OF SOME EXAMPLES OF THE INVENTION

In accordance with an exemplary method of the present invention, at least one layer of microwave interactive material, which is for becoming hot when exposed to microwave energy, is upon a turntable tray in a microwave oven. The microwave interactive material is exposed to microwave energy, so that the turntable tray is heated by the microwave interactive material.

In accordance with an aspect of the present invention, the layer(s) of microwave interactive material are configured in a manner that seeks to restrict heating of the periphery of the turntable tray by the microwave interactive material.

According to one aspect of the present invention, the turntable tray is heated by the microwave interactive material so that a peak thermally induced stress occurs in the turntable tray at a position proximate the periphery of the tray. In accordance with this aspect, the layer(s) of microwave interactive material are configured in a manner so that the peak thermally induced stress is less than a predetermined amount (e.g., less than the tensile strength of the turntable tray).

In accordance with one embodiment of the present invention, the periphery of the layer of microwave interactive material is absent of acute corners (e.g., absent of a corner formed by edges that meet at an angle of 90 degrees or less). In contrast, the corners of the layer of microwave interactive material can be beveled (e.g. rounded, truncated, or the like) so that they seek to limit the peak thermally induced stress in the turntable tray.

The at least one layer of microwave interactive material can include first and second layers of microwave interactive material. For example, the first layer can be substantially continuous, whereas the second layer can be discontinuous (e.g., patterned), with the second layer being adjacent and extending outwardly from the periphery of at least a portion of the first layer. Per unit area, the second layer absorbs less microwave energy, and thereby becomes less hot, as compared to the first layer. This arrangement seeks to limit the peak thermally induced stress in the turntable tray.

In accordance with a first example of the present invention, a construct (e.g., a susceptor, or a bottom panel of a construct such as a tray, box, a bag for popping popcorn, or the like) is provided for overlying a surface in a microwave oven while supporting food being cooked in the microwave oven. The construct can include at least one layer of microwave interactive material mounted to a support layer. The layer of microwave interactive material is operative for becoming hot when exposed to microwave energy. The support layer can be at least generally polygonal-shaped, so that it includes a plurality of edges and a plurality of corners. The layer of microwave interactive material can extend at least substantially all the way to at least one of the edges of the support layer, and typically it extends substantially all the way to two, three or four of the edges of the support layer. The periphery of the layer of microwave interactive material typically is at least partially recessed from at least a portion of one or more of, or typically all of, the corners of the support layer, so that at least some of the corner(s) are not covered by the layer of microwave interactive material. Having the periphery of the layer of microwave interactive material recessed from corner(s) advantageously seeks to control thermally induced stress, such as in turntable trays in microwave ovens.

In accordance with one version of the first example, the layer of microwave interactive material can be a first layer of microwave interactive material (e.g., a relatively continuous layer of microwave interactive material). In addition, a second layer of microwave material (e.g., a patterned layer of microwave interactive material that is less absorbent of microwave energy than the first layer of microwave interactive material) at least partially covers portion(s) of, and typically substantially fully covers, the corners of the support layer that are not covered by the first layer of microwave interactive material. Having the second layer of microwave interactive material advantageously seeks to enhance the heating, whereas having the second layer of microwave material be less absorbent of microwave energy than the first layer of microwave interactive material advantageously seeks to control the heating in a manner that controls thermally induced stress, such as in turntable trays in microwave ovens. Typically the first and second layers of microwave interactive material are not superposed with respect to one another, although other arrangements are also within the scope of the present invention.

More specifically, an example of an aspect of the present invention is the configuring of the periphery of one or more layers of microwave interactive material, which is for becoming hot when exposed to microwave energy, in a manner that seeks to advantageously control heating, so that the periphery of the microwave interactive material can typically safely be adjacent the periphery of a turntable tray.

In accordance with an example of the present invention, a construct (e.g., a susceptor, or a bottom panel of a construct such as a tray, box or the like) is provided for overlying a surface in a microwave oven while supporting food being cooked in the microwave oven. The construct can include first and second areas of microwave interactive material that are mounted to a support layer. Each of the first and second areas of microwave interactive material is operative for becoming hot when exposed to microwave energy. The support layer includes a periphery, and the second area of microwave interactive material is positioned between the first area of microwave interactive material and at least a portion of the periphery of the support layer. Per unit area, the first area of microwave interactive material (e.g., a relatively continuous layer (e.g., substantially continuous layer) of microwave interactive material) is more absorbent of microwave energy than the second area of microwave interactive material (e.g., a relatively discontinuous layer (e.g., patterned layer) of microwave interactive material). This advantageously seeks to control thermally induced stress, such as in turntable trays in microwave ovens. The second area of microwave interactive material can extend at least partially around, or at least about a third of the way around, or at least about half of the way around, or at least about two thirds of the way around, or at least about three fourths of the way around, or even fully around the first area of microwave interactive material.

As one example, a suitable microwave interactive material can have an optical density of less than about 0.5, and/or a thickness of less than about 200 angstroms.

Other aspects and advantages of the present invention will become apparent from the following.

BRIEF DESCRIPTION OF THE DRAWINGS

Further reference will now be made to the accompanying drawings, which are not necessarily drawn to scale, and wherein:

FIGS. 2A-G schematically and partially illustrates theoretical thermally induced stress in differently sized turntable trays, with the stress resulting from the use of the bottom panel/susceptor illustrated in FIG. 1;

DETAILED DESCRIPTION OF EXEMPLARY EMBODIMENTS

Figure 1:
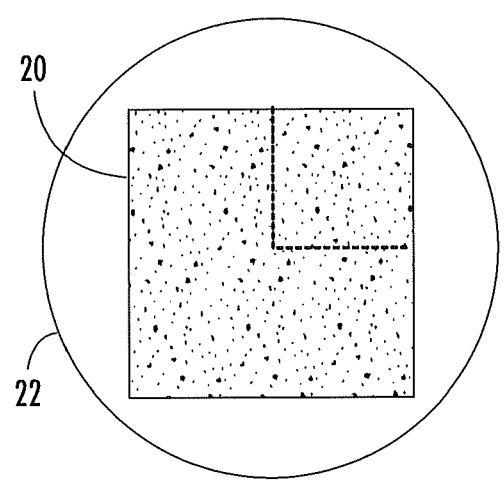
FIG. 1 is a schematic top plan view of a package's bottom panel/susceptor that is upon a turntable tray, in accordance with the prior art.
Figure 2A:
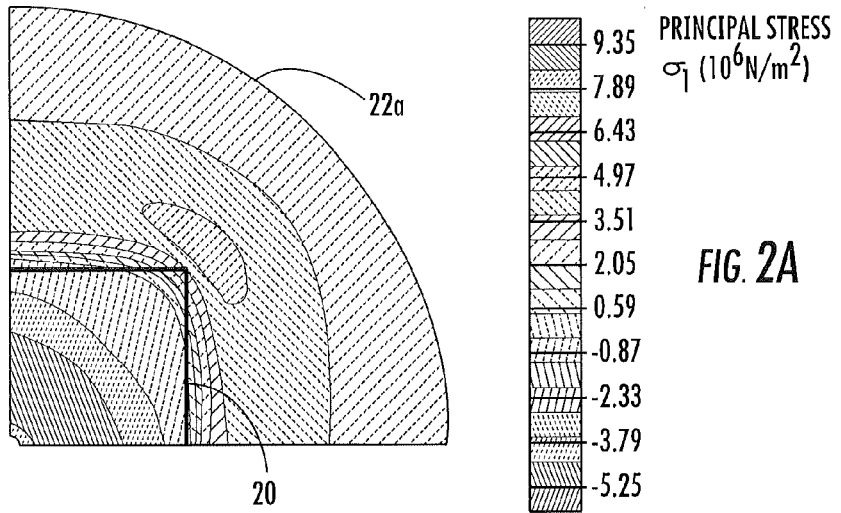
Figure 2B:
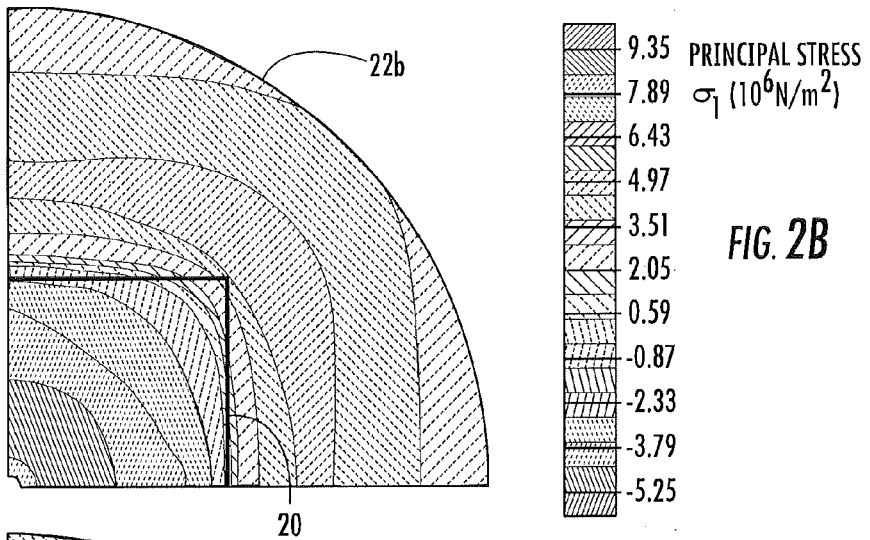
Figure 2C:
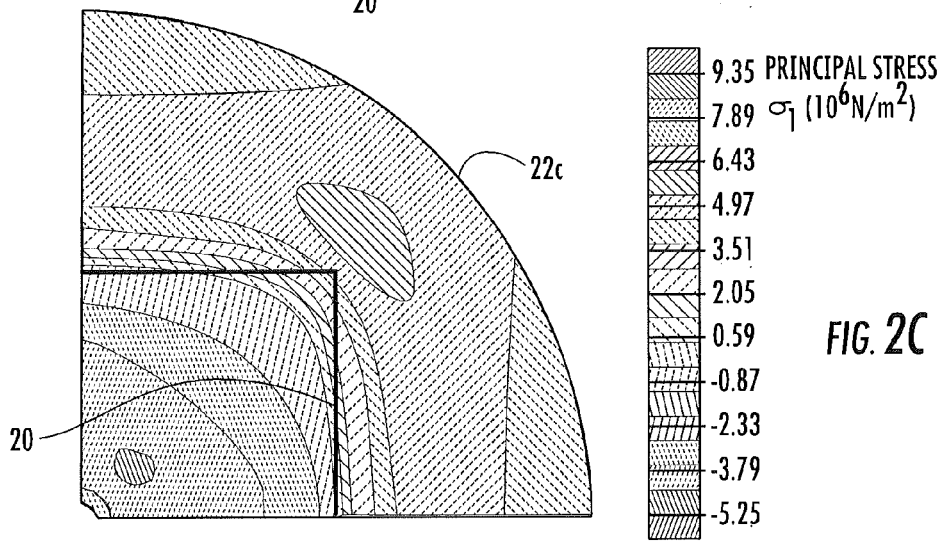
Figure 2G:
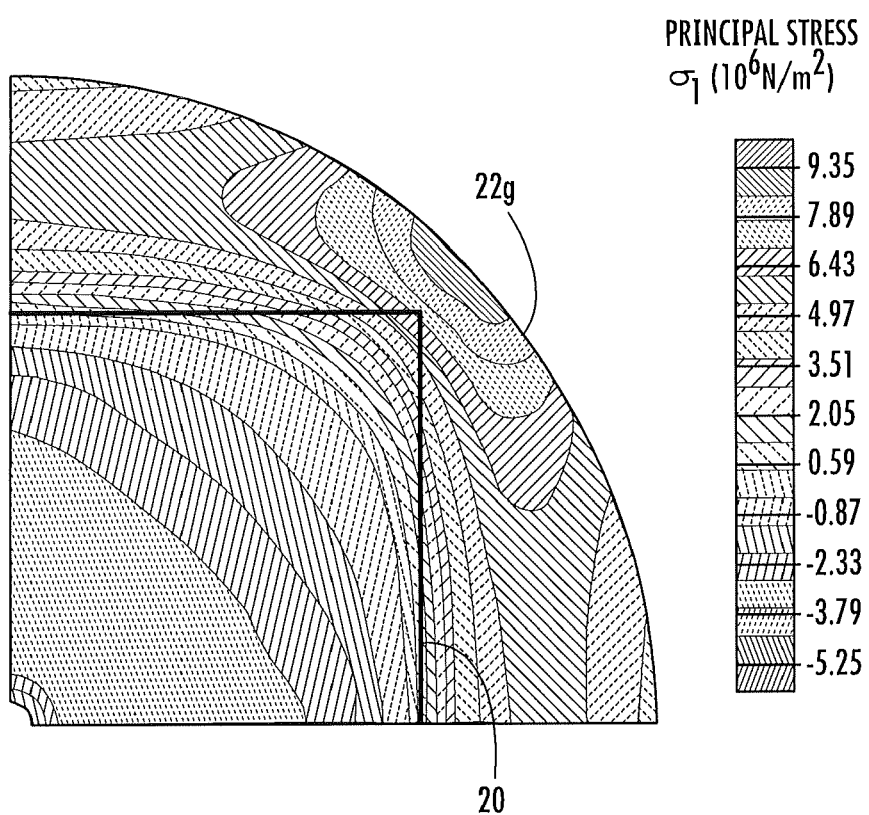

Referring now in greater detail to some of the drawings, in which like numerals refer to like parts throughout the several views, exemplary embodiments of the present invention are described in the following. For some of the like or similar parts of different embodiments, reference numerals are incremented by one hundred.

First Embodiment

Figure 3A:
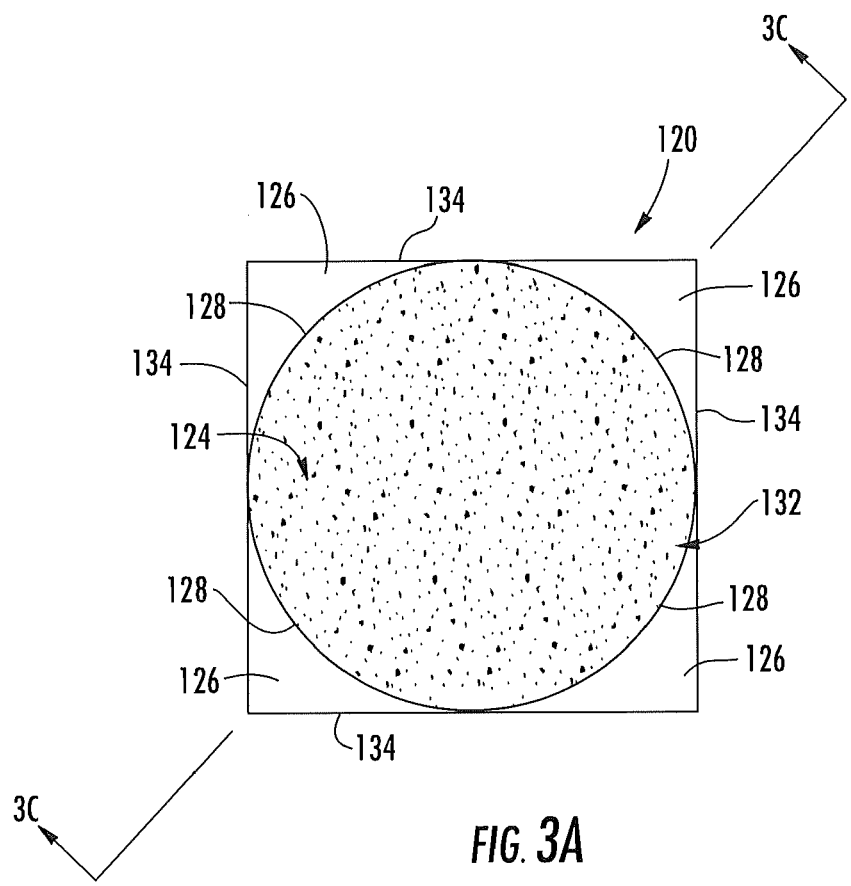
FIG. 3A is an isolated, schematic top plan view of a bottom panel/susceptor that can be placed upon a disk-shaped tray of a turntable in a microwave oven, in accordance with a first embodiment of the present invention.
Figure 3B:
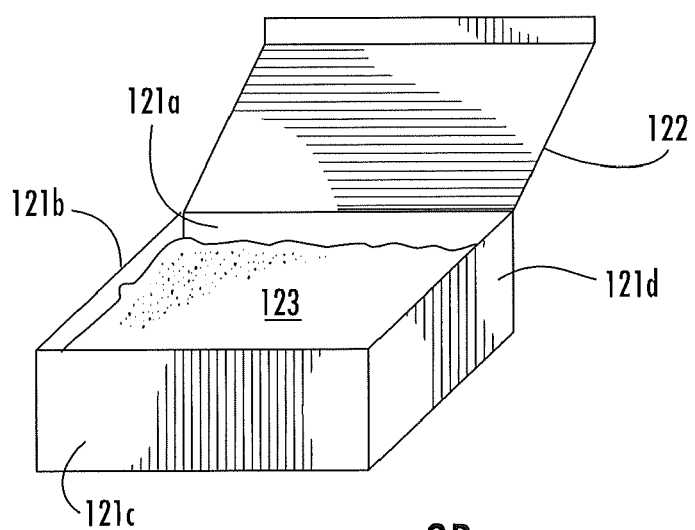
FIG. 3B schematically illustrates a construct (e.g., a box) that incorporates the bottom panel/susceptor of FIG. 3A and contains food, in accordance with an example of the first embodiment of the present invention.

FIG. 3A is a schematic top plan view of a construct or package's bottom panel 120 that can be placed upon a disk-shaped tray of a turntable (e.g., see turntable tray 22 of FIG. 1) in a microwave oven (not shown), in accordance with a first embodiment of the present invention. The bottom panel 120 is shown in isolation in FIG. 3A. As best understood with reference to FIG. 3B, in some versions of the first embodiment, the package that includes the bottom panel 120 is an open-top tray so that four side panels 121a-d, or the like, extend upwardly respectively from the four edges of the bottom panel 120. In some versions of the first embodiment, the package is a box, so that not only are there four side panels 121a-d that extend upwardly respectively from the four edges of the bottom panel 120, but there is also a top panel or lid 122, or the like, for closing the tray-like portion of the package. As shown in FIG. 3B, the lid 122 is pivotably connected by a fold line to the upper edge of the rear side panel 121a, although many other arrangements are possible. It is also within the scope of the present invention for the bottom panel 120 to serve as a construct that does not have structures like the side panels 121a-d and lid 122 connected thereto. The construct, tray and box that comprise the bottom panel 120 can be made of paperboard or other suitable material, such that the tray and box can be characterized as being cartons that can be erected from blanks, and other types of cartons that incorporate the bottom panel 120 are also within the scope of the present invention. As one alternative example, the construct, tray, box or the like, which includes the bottom panel 120, can be molded or otherwise formed from polymeric material, pulp, or other suitable substances. Food 123 is schematically illustrated in the package of FIG. 3B.

A wide variety of other constructs or packages are also within the scope of the present invention. For example, susceptors of the present invention can be incorporated into flexible packaging and flexible materials for forming packaging, such as, but not limited to, flexible bag-like packages within which popcorn is popped in a microwave oven, for example MicroFlex Q brand packaging or other packaging material available from Graphic Packaging International (Marietta, Ga.). As one specific example, in a flexible bag-like package for popping popcorn, the "bag" typically has multiple plies, and the susceptor is typically sandwiched between plies at one side of the bag (e.g., at the bottom side of the bag), and the susceptors of the present invention can be used in such an application. As another specific example, MicroFlex Q brand packaging material includes susceptor material and can be used to make flexible packaging, and the susceptors of the present invention can be used in such an application. That is, it is contemplated that the susceptors of the present invention can at least be used in those applications where it is typical to use conventional susceptors, such as in a wide variety of cartons or other types of containers, including bags in which popcorn is popped, or the like. As one specific example, for a conventional bag that contains popcorn and includes a conventional susceptor for at least partially facilitating heating/popping of the popcorn, the conventional susceptor can be replaced with a susceptor of the present invention.

As illustrated in FIG. 3A, the overall shape of the bottom panel 120 is a parallelogram, namely a square. In use, the lower surface of the bottom panel 120 can be in opposing face-to-face contact with the upper surface of a microwave oven's turntable tray. The bottom panel 120 includes a circular central region 124 that includes a layer of microwave interactive material 125 (best seen in FIG. 3C). The layer of microwave interactive material 125 is schematically represented by stippling in FIG. 3A. In accordance with the first embodiment of the present invention, the microwave interactive material 125 is continuous across the entire central region 124, and the microwave interactive material is operative for becoming hot when exposed to microwave energy of the type that is typically provided by conventional microwave ovens. Also in accordance with the first embodiment, the bottom panel 120 includes corner regions 126 that are completely absent of microwave interactive material.

Throughout this Detailed Description section of this disclosure, the absence of microwave interactive material from a region can, for example, be the result of the microwave interactive material having been deactivated in, never deposited in, and/or removed from the region, as will be discussed in greater detail below. Throughout the Detailed Description section of this disclosure, in many instances absolute terms are used, but this use of absolute terms should be understood as being "for example". For example, in some situations it is indicated that certain regions are entirely covered (e.g., with the continuous layer of microwave interactive material or the patterned layer of microwave interactive material) or that certain regions are absent of microwave interactive material. Nonetheless, and in all regards, it is also within the scope of the present invention for there to be some variability. For example, where it is mentioned that certain regions are "entirely covered", the present invention is also intended to encompass situations where there is "substantially entire coverage". As an additional example, when it is mentioned that certain regions are "absent of" microwave interactive material, the present invention is also intended to encompass situations where there is a "substantial absence of" microwave interactive material.

Figure 3C:
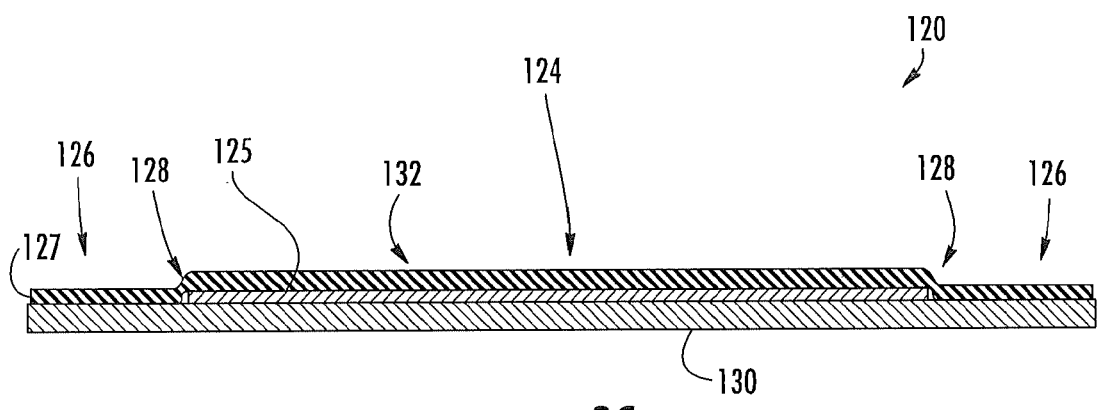
FIG. 3C is a schematic cross-sectional view of the bottom panel of FIG. 3A, with the cross-section taken along line 3C-3C of FIG. 3A.

FIG. 3C is a schematic cross-sectional view of the bottom panel 120, with the cross-section taken along line 3C-3C of FIG. 3A. As shown in FIG. 3C, the central region 124 of the bottom panel 120 includes the continuous layer of the microwave interactive material 125 sandwiched between an upper support layer 127 and a lower support layer 130. As will be discussed in greater detail below, the upper support layer 127 can be a substrate (e.g., polymeric film) to which the microwave interactive material 125 is initially applied, so that the upper layer together with the microwave interactive material can be characterized as a susceptor 132. The lower support layer 130 is typically a portion of a construct (e.g., tray, box or the like) to which the susceptor 132 is attached, such as through the use of an adhesive material (not shown) or any other suitable means. For example, the lower support layer 130 can be a polymeric or paperboard panel of a construct. During cooking, the lower surface of the lower support layer 130 is typically upon (e.g., in opposing face-to-face contact with) the turntable in the microwave oven, and the food 123 (FIG. 3B) is typically upon (e.g., in opposing face-to-face contact with) the upper surface of the upper support layer 127.

As mentioned above with reference to FIG. 3A, the microwave interactive material 125 can be continuous across the entire central region 124 of the bottom panel 120. More specifically and as best understood while also reviewing FIG. 3C, the entire central region 124 of the lower support layer 130 can be entirely covered with the layer of microwave interactive material 125 that is operative for becoming hot when exposed to microwave energy of the type that is typically provided by conventional microwave ovens.

As mentioned above with reference to FIG. 3A, the bottom panel 120 includes the corner regions 126 that are absent of microwave interactive material. More specifically and as best understood while also reviewing FIG. 3C, the upper surface of the lower support layer 130 of the bottom panel 120 includes corner regions 126 that are absent of (e.g., not covered with) microwave interactive material 125.

As best understood while referring to FIGS. 3A and 3C, FIG. 3A is also schematically illustrative of the susceptor 132 (e.g., a susceptor patch) in isolation (e.g., the support layer 127 of the susceptor 132 can, in a plan view, correspond in shape and size to the bottom panel 120), although the edges of the support layer 127 of the susceptor will typically extend at least slightly outwardly beyond the edges of the microwave interactive material 125 to keep the food 123 (FIG. 3B) from contacting the microwave interactive material. Alternatively, other measures can be taken to keep the food 123 from contacting the microwave interactive material 125, or in some cases it may not be desirable or necessary to keep the food from contacting the microwave interactive material. The support layer 127 of the susceptor 132 includes a circular central region 124, which is entirely covered with the continuous layer of microwave interactive material 125, and corner regions 126, which are absent of microwave interactive material.

Each of the corner regions 126 can be characterized as being associated with a beveled (e.g., truncated) corner 128 of the central region 124. That is, the central region 124 can be very generally characterized as being in the form of a polygon, more specifically a parallelogram, namely a square, with beveled corners 128. More specifically, the beveled corners 128 are defined by the peripheral edge of the layer of microwave interactive material 125. In accordance with the first embodiment of the present invention, the subject "beveling" of the beveled corners 128 is seen in the plan view of FIG. 3A; in the plan view the central region 124 does not include peripheral edges that meet at 90 degrees. For a more detailed discussion of "beveled corners", for example see the following discussion of the beveled corners 434 of the fourth embodiment of the present invention.

As illustrated in FIG. 3A, each of the beveled corners 128 is arcuate, more specifically each of the beveled corners has a radius of curvature. Each of the centers of curvature of the beveled corners 128 are positioned in the central region 124. More specifically, all of the beveled corners 128 share a single center of curvature such that the central region 124 is in the form of a circle. In accordance with the first embodiment of the present invention, the single center of curvature is located at the center of the bottom panel 120. The beveled corners 128 can be differently shaped, and when they are circular they are not required to share the same center of curvature.

As best understood with reference to FIG. 3A and in accordance with the first embodiment of the present invention, the lower support layer 130 (FIG. 3C) is at least generally polygonal-shaped; therefore, it includes the corner regions 126, which are at least generally in the form of corners, and edges 134, which respectively extend between the corner regions 126. More specifically in accordance with the first embodiment, the lower support layer 130 is polygonal-shaped, namely square-shaped; therefore, the corner regions 126 are each in the form of right-angled corners, although differently shaped corner regions are also within the scope of the present invention. So as to advantageously maximize the heat provided by the susceptor 132, the central region 124 (i.e., the layer of microwave interactive material 125) extends at least substantially all the way to the edges 134 of the lower support layer 130. More specifically, the central region 124 (i.e., the microwave interactive material 125) extends all the way to the portions of the edges 134 that are intermediate of the corner regions 126. In a first variation of the first embodiment, which is identical to the first embodiment except for variations noted and variations that will be apparent to those of ordinary skill in the art, the central region 124/the microwave interactive material 125 does not extend all the way to the edges 134 of the lower support layer 130; nonetheless, it extends close enough to the edges 134 (e.g., within about 0.1 inches of the edges 134, or more specifically within about 0.05 inches of the edges 134) so that the central region 124 (i.e., the microwave interactive material 125) can still be characterized as extending at least substantially all the way to the edges 134 of the lower support layer 130.

As best understood with reference to FIG. 3A and in accordance with the first embodiment of the present invention, the beveled corners 128 (which are defined by the periphery of the central region 124, or which are more specifically defined by the periphery of the layer of microwave interactive material 125) respectively are recessed from portions of the corner regions 126 of the lower support layer 130 so that the outer portions of the corner regions 126 are absent of the microwave interactive material 125. The absence of the microwave interactive material 125 from, or alternatively the reduction of the amount of microwave interactive material 125 in, the outer portions of the corner regions 126 advantageously seeks to control thermally induced stresses in turntable trays, as will be discussed in greater detail below. That is and briefly described, it has been determined that it can be advantageous to at least reduce the rate of heating in the outer portions of the corner regions 126, because doing so can advantageously limit the peak thermally induced stress in turntable trays.

Numerous materials may be suitable for use in forming the various constructs of the present invention. As mentioned above, the layer of microwave interactive material 125 is operative for becoming hot when exposed to microwave energy of the type that is typically provided by conventional microwave ovens; therefore, the microwave interactive material 125 and at least the components closely associated therewith (e.g., the upper and lower support layers 127, 130) are typically selected so that they are resistant to softening, scorching, combusting, or degrading at typical microwave oven heating temperatures, for example, at from about 250° F. to about 425° F.

In accordance with one example of the first embodiment of the present invention, the susceptor 132 is a laminate of the support layer 127 and the microwave interactive material 125, with the support layer 127 being a microwave transparent material (e.g., a polymeric film) and the microwave interactive material 125 being a thin layer of electroconductive material deposited (e.g., by sputter deposition) onto the support layer 127. More specifically, the microwave interactive material 125 is typically applied to the support layer 127 by vacuum metalizing. The microwave interactive material 125 is sufficiently thin to become hot when exposed to microwave energy (e.g., the microwave interactive material 125 can be characterized as being operative for converting microwave energy to heat). The thinness of the microwave interactive material 125 reduces the conductivity and the microwave reflectance characteristics of the susceptor 132 as compared to conductive metallic foils. A suitable microwave interactive material 125 is a layer of aluminum having a thickness in a range of about 50 angstroms to about 200 angstroms, and an optical density in a range of about 0.1 through about 0.5. Optical density is derived from the negative logarithm of the ratio of transmitted light to incident light. High optical density materials generally have a shiny appearance, whereas thinner metallic materials have a flat, opaque appearance. In accordance with one aspect, the microwave interactive material 125 has a thickness of less than about 200 angstroms. In accordance with one aspect, the microwave interactive material 125 has a thickness of less than about 175 angstroms. In accordance with one aspect, the microwave interactive material 125 has a thickness of less than about 150 angstroms. In accordance with one aspect, the microwave interactive material 125 has a thickness of less than about 125 angstroms. In accordance with one aspect, the microwave interactive material 125 has a thickness of less than about 100 angstroms. In accordance with one aspect, the microwave interactive material 125 has a thickness of less than about 75 angstroms. In accordance with one aspect, the microwave interactive material 125 has an optical density of less than about 0.5. In accordance with one aspect, the microwave interactive material 125 has an optical density of less than about 0.4. In accordance with one aspect, the microwave interactive material 125 has an optical density of less than about 0.3. In accordance with one aspect, the microwave interactive material 125 has an optical density of about 0.2, or less. In accordance with one theoretical example, any of the above-described thicknesses can exist in combination with any of the above-described optical densities.

More generally, the microwave interactive material 125 may be an electroconductive or semiconductive material, for example, a metal or a metal alloy provided as a metal foil; a vacuum deposited metal or metal alloy; or a metallic ink, an organic ink, an inorganic ink, a metallic paste, an organic paste, an inorganic paste, or any combination thereof. Examples of metals and metal alloys that may be suitable for use as the microwave interactive material 125 include, but are not limited to, aluminum, chromium, copper, inconel alloys (nickel-chromium-molybdenum alloy with niobium), iron, magnesium, nickel, stainless steel, tin, titanium, tungsten, and any combination or alloy thereof.

Alternatively, the microwave interactive material 125 may comprise a metal oxide. Examples of metal oxides that may be suitable for use as the microwave interactive material 125 include, but are not limited to, oxides of aluminum, iron, and tin, used in conjunction with an electrically conductive material where needed. Another example of a metal oxide that may be suitable for use as the microwave interactive material 125 is indium tin oxide (ITO). For example, to form the susceptor 132, ITO may be sputtered onto the support layer 127, and the support layer 127 can be a clear polymeric film or other suitable material. The sputtering process typically occurs at a lower temperature than the evaporative deposition process used for metal deposition. ITO has a more uniform crystal structure and, therefore, is clear at most coating thicknesses.

Alternatively, the microwave interactive material 125 may comprise a suitable electroconductive, semiconductive, or non-conductive artificial dielectric or ferroelectric material. Artificial dielectrics comprise conductive, subdivided material in a polymeric or other suitable matrix or binder, and may include flakes of an electroconductive metal, for example, aluminum.

In accordance with the first embodiment of the present invention, the microwave interactive material 125 is at least substantially continuous at and inwardly of the periphery of the central region 124. That is, at and inwardly of the periphery of the central region 124, the microwave interactive material 125 extends without substantial breaks or interruptions. In accordance with a second variation of the first embodiment, which is identical to the first embodiment except for variations noted and variations that will be apparent to those of ordinary skill in the art, the microwave interactive material 125 is discontinuous at and/or inwardly of the periphery of the central region 124. That is, for the second variation, the microwave interactive material 125 is discontinuous at and/or inwardly of the periphery of the central region 124, for example, by the microwave interactive material 125 including one or more breaks or apertures that transmit microwave energy therethrough. The breaks or apertures may be sized and positioned to pass microwave energy to particular areas of the food 123. The number, shape, size, and positioning of such breaks or apertures may vary for a particular application depending on type of construct being formed, the food item to be heated therein or thereon, the desired degree of browning and/or crisping, whether direct exposure to microwave energy is needed or desired to attain uniform heating of the food item, the need for regulating the change in temperature of the food item through direct heating, and whether and to what extent there is a need for venting.

The aperture may be a physical aperture or void in the material used to form the construct, or may be a non-physical "aperture". A non-physical aperture may be a portion of the construct that is microwave energy inactive by deactivation or otherwise, or one that is otherwise transparent to microwave energy. Thus, for example, the aperture may be a portion of the construct formed without a microwave energy active material or, alternatively, may be a portion of the construct formed with a microwave energy active material that has been deactivated. While both physical and non-physical apertures allow the food item to be heated directly by the microwave energy, a physical aperture also provides a venting function to allow steam or other vapors to be released from the food item. Examples of suitable susceptors that include non-physical apertures are QWIKWAVE® Focus susceptors available from Graphic Packaging International (Marietta, Ga.).

Figure 3D:
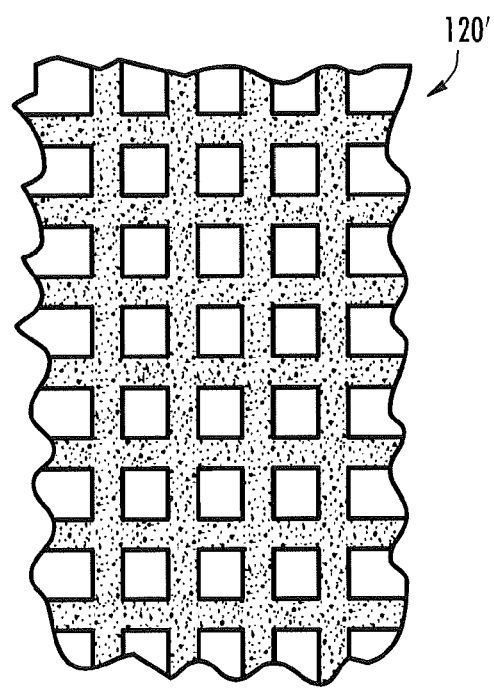
FIG. 3D schematically illustrates a plan view of a portion of a central region of a bottom panel/susceptor that includes a patterned layer of microwave interactive material, in accordance with a variation of the first embodiment of the present invention.

FIG. 3D schematically illustrates a plan view of a portion of the central region 124' in accordance with one example of the second variation of the first embodiment. As illustrated in FIG. 3D, the microwave interactive material is arranged in a pattern, namely a grid pattern; non-stippled areas of the central region 124' denote areas that are microwave energy inactive, whereas stippled areas of the central region 124' denote areas that are microwave energy active. That is, FIG. 3D schematically illustrates an example of a patterned layer of microwave interactive material (e.g., in which the coverage of the microwave interactive material is about 44%). The patterned layer of microwave interactive material includes interspersed areas that are substantially transparent to microwave energy. In accordance with the second variation of the first embodiment, the circular central region 124' is entirely covered with the patterned layer of microwave interactive material, and the corner regions (e.g., see the corner regions 126 shown in FIG. 3) are entirely absent of microwave interactive material. Except for its patterned characteristics, the patterned layer of microwave interactive material (e.g., see FIG. 3D) can be like the above-described microwave interactive material (e.g., the microwave interactive material 125 shown in FIG. 3C).

As mentioned above with reference, for example, to FIG. 3C, in accordance with the first embodiment of the present invention, the microwave interactive material 125 can be supported on a support layer 127. The support layer 127 can be a microwave inactive or transparent substrate that is used for ease of handling and/or to prevent contact between the microwave interactive material 125 and the food 123. The support layer 127 typically comprises an electrical insulator, for example, a film formed from a polymer or polymeric material. As used herein the term "polymer" or "polymeric material" includes, but is not limited to, homopolymers, copolymers, such as for example, block, graft, random, and alternating copolymers, terpolymers, etc. and blends and modifications thereof. Furthermore, unless otherwise specifically limited, the term "polymer" shall include all possible geometrical configurations of the molecule. These configurations include, but are not limited to isotactic, syndiotactic, and random symmetries.

The thickness of the film that can serve as the support layer 127 typically may be from about 35 gauge to about 10 mil. In one aspect, the thickness of the film is from about 40 to about 80 gauge. In another aspect, the thickness of the film is from about 45 to about 50 gauge. In still another aspect, the thickness of the film is about 48 gauge. Examples of polymeric films that may be suitable include, but are not limited to, polyolefins, polyesters, polyamides, polyimides, polysulfones, polyether ketones, cellophanes, or any combination thereof. Other non-conducting substrate materials such as paper and paper laminates, metal oxides, silicates, cellulosics, or any combination thereof, also may be used for the support layer 127.

In one example, the polymeric film that can serve as the support layer 127 comprises polyethylene terephthalate (PET). Polyethylene terephthalate films are used in commercially available susceptors, for example, the QWIKWAVE® Focus susceptor and the MICRORITE® susceptor, both available from Graphic Packaging International (Marietta, Ga.). Examples of polyethylene terephthalate films that may be suitable for use as the substrate include, but are not limited to, MELINEX®, available from DuPont Teijan Films (Hopewell, Va.), SKYROL, available from SKC, Inc. (Covington, Ga.), and BARRIALOX PET, available from Toray Films (Front Royal, Va.), and QU50 High Barrier Coated PET, available from Toray Films (Front Royal, Va.).

The polymeric film may be selected to impart various properties to the microwave interactive web, for example, printability, heat resistance, or any other property. As one particular example, the polymeric film may be selected to provide a water barrier, oxygen barrier, or a combination thereof. Such barrier film layers may be formed from a polymer film having barrier properties or from any other barrier layer or coating as desired. Suitable polymer films may include, but are not limited to, ethylene vinyl alcohol, barrier nylon, polyvinylidene chloride, barrier fluoropolymer, nylon 6, nylon 6,6, coextruded nylon 6/EVOH/nylon 6, silicon oxide coated film, barrier polyethylene terephthalate, or any combination thereof.

One example of a barrier film that may be suitable for use with the present invention is CAPRAN® EMBLEM 1200M nylon 6, available from Honeywell International (Pottsville, Pa.). Another example of a barrier film that may be suitable is CAPRAN® OXYSHIELD OBS monoaxially oriented coextruded nylon 6/ethylene vinyl alcohol (EVOH)/nylon 6, also available from Honeywell International. Yet another example of a barrier film that may be suitable for use with the present invention is DARTEK® N-201 nylon 6,6, available from Enhance Packaging Technologies (Webster, N.Y.). Additional examples include BARRIALOX PET, available from Toray Films (Front Royal, Va.) and QU50 High Barrier Coated PET, available from Toray Films (Front Royal, Va.), referred to above.

Still other barrier films that can serve as the support layer 127 include silicon oxide coated films, such as those available from Sheldahl Films (Northfield, Minn.). Thus, in one example, the susceptor 132 may have a structure including a film, for example, polyethylene terephthalate, with a layer of silicon oxide coated onto the film, and ITO or other material deposited over the silicon oxide. If needed or desired, additional layers or coatings may be provided to shield the individual layers from damage during processing.

The barrier film may have an oxygen transmission rate (OTR) of less than about 20 $cc/m^2/day$ as measured using ASTM D3985. In one aspect, the barrier film has an OTR of less than about 10 $cc/m^2/day$. In another aspect, the barrier film has an OTR of less than about 1 $cc/m^2/day$. In still another aspect, the barrier film has an OTR of less than about 0.5 $cc/m^2/day$. In yet another aspect, the barrier film has an OTR of less than about 0.1 $cc/m^2/day$.

The barrier film may have a water vapor transmission rate (WVTR) of less than about 100 $g/m^2/day$ as measured using ASTM F1249. In one aspect, the barrier film has a WVTR of less than about 50 $g/m^2/day$. In another aspect, the barrier film has a WVTR of less than about 15 $g/m^2/day$. In yet another aspect, the barrier film has a WVTR of less than about 1 $g/m^2/day$. In still another aspect, the barrier film has a WVTR of less than about 0.1 $g/m^2/day$. In a still further aspect, the barrier film has a WVTR of less than about 0.05 $g/m^2/day$.

The microwave interactive material 125 may be applied to the support layer 127 in any suitable manner to form the susceptor 132, and in some instances, the microwave interactive material is printed on, extruded onto, sputtered onto, evaporated on, or laminated to the support layer 127. The microwave interactive material 125 may be applied to the support layer 127 in any pattern, and using any technique, to achieve the desired heating effect of the food item.

As mentioned above, a construct (e.g., bottom panel 120) can include the susceptor 132 mounted to the support layer 130. The support layer 130 typically is a dimensionally stable, microwave energy transparent support. In one aspect, all or a portion of the support layer 130 may be formed at least partially from a paperboard material, which may be cut into a blank prior to use in the construct. For example, the support layer 130 may be formed from paperboard having a basis weight of from about 60 to about 330 lbs/ream, for example, from about 80 to about 140 lbs/ream. The paperboard generally may have a thickness of from about 6 to about 30 mils, for example, from about 12 to about 28 mils. In one particular example, the paperboard has a thickness of about 12 mils. Any suitable paperboard may be used, for example, a solid bleached or solid unbleached sulfate board, such as SUS® board, available from Graphic Packaging International.

Alternatively, all or a portion of the support layer 130 may be formed at least partially from a polymeric material, for example, coextruded polyethylene terephthalate or polypropylene. Other materials are contemplated hereby.

Optionally, one or more portions of the various blanks, supports, packages, or other constructs described herein or contemplated hereby may be coated with varnish, clay, or other materials, either alone or in combination. The coating may then be printed over with product advertising or other information or images. The blanks, supports, packages, or other constructs also may be coated to protect any information printed thereon.

Furthermore, the blanks, supports, packages, or other constructs may be coated with, for example, a moisture and/or oxygen barrier layer, on either or both sides, such as those described above. Any suitable moisture and/or oxygen barrier material may be used in accordance with the present invention. Examples of materials that may be suitable include, but are not limited to, polyvinylidene chloride, ethylene vinyl alcohol, DuPont DARTEK™ nylon 6,6, and others referred to above.

Alternatively or additionally, any of the blanks, supports, packages, or other constructs of the present invention may be coated or laminated with other materials to impart other properties, such as absorbency, repellency, opacity, color, printability, stiffness, or cushioning. For example, absorbent susceptors are described in U.S. Provisional Application No. 60/604,637, filed Aug. 25, 2004, and U.S. patent application Ser. No. 11/211,858, to Middleton, et al., titled "Absorbent Microwave Interactive Packaging", filed Aug. 25, 2005, both of which are incorporated herein by reference in their entirety. Additionally, the blanks, supports, packages, or other constructs may include graphics or indicia printed thereon.

As should be apparent from the foregoing, FIG. 3C is schematic for several reasons. For example, FIG. 3A has not been drawn to scale. As another example, whereas each of the support layers 127, 130 is shown in FIG. 3C as being a single layer, each can consist of more than one layer of material.

As mentioned above, one feature of the first exemplary embodiment of the present invention is the bottom panel 120/susceptor 132 that include the microwave interactive material 125, which is operative for becoming hot when exposed to microwave energy. It is within the scope of the present invention for the items of the present invention to additionally include microwave interactive materials that perform functions other than becoming hot when exposed to microwave energy, such as microwave interactive materials that function primarily to shield a particular area of the food item from microwave energy to prevent overcooking thereof, and/or microwave interactive materials that function to transmit microwave energy towards or away from a particular area of the food item.

Second Embodiment

Figure 4:
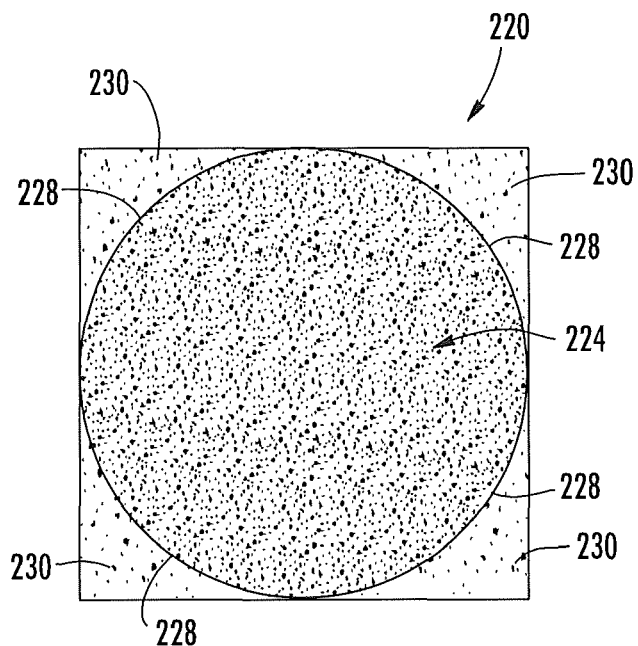
FIG. 4 is an isolated, schematic top plan view of a bottom panel/susceptor that can be placed upon a disk-shaped tray of a turntable in a microwave oven, in accordance with a second embodiment of the present invention.

FIG. 4 illustrates a bottom panel 220 of a second embodiment of the present invention. The first and second embodiments are alike, except for variations noted and variations that will be apparent to those of ordinary skill in the art.

In addition to the central region 224 of the upper surface of the lower support layer (e.g., see the lower support layer 130 shown in FIG. 3C) of the bottom panel 220 being entirely covered with a continuous layer of microwave interactive material (e.g., see the continuous layer of microwave interactive material 125 of FIG. 3C), the corner regions 230 of the upper surface of the lower support layer of the bottom panel 220 are entirely covered with a patterned layer of microwave interactive material. The continuous layer of microwave interactive material is schematically represented by the relatively heavy stippling in FIG. 4. The patterned layer of microwave interactive material is schematically represented by the relatively light stippling in FIG. 4. Per unit area, the patterned layer of microwave interactive material absorbs less microwave energy, and thereby becomes less hot, as compared to the continuous layer of microwave interactive material. This advantageously seeks to limit the peak thermally induced stress in an associated turntable tray, as will be discussed in greater detail below.

The patterned layer of microwave interactive material can be like that illustrated in FIG. 3D, although other patterns are also within the scope of the present invention. Throughout the Detailed Description section of this disclosure, the patterned layer of microwave interactive material can be any pattern that results in there being less microwave interactive material per unit area than in the continuous layer of microwave interactive material, such as, but not limited to, a grid pattern, or patterns provided with Focus Quikwave brand susceptors available from Graphic Packaging International (Marietta, Ga.).

The central region 224 can be very generally characterized as being in the form of a polygon, more specifically a parallelogram, namely a square, with beveled corners 228. More specifically, the beveled corners 228 are defined by the peripheral edge of the continuous layer of microwave interactive material. The beveled corners 228 are respectively recessed from outer portions of the corner regions 230.

FIG. 4 is also schematically illustrative of a susceptor in isolation. The support layer (e.g., see the support layer 127 of FIG. 3C) of the susceptor can, in a plan view, correspond in shape and size to the bottom panel 220. The support layer of the susceptor has a central region 224, which is entirely covered with the continuous layer of microwave interactive material (e.g., see the continuous layer of microwave interactive material 125 of FIG. 3C), and corner regions 230, which are each entirely covered with the patterned layer of microwave interactive material. The patterned layer of microwave interactive material can be in the form of a wide variety of different patterns such as, but not limited to, the grid pattern shown in FIG. 3D.

Both the continuous layer of microwave interactive material, which is in the central region 224, and the patterned layer of microwave interactive material, which is in the corner regions 230, are for absorbing microwave energy and thereby becoming hot. However, for a sufficiently large unit area, the continuous layer of microwave interactive material is more absorbent of microwave energy than the patterned layer of microwave interactive material. That is, while the continuous layer of microwave interactive material and the patterned layer of microwave interactive material are exposed to substantially identical conditions in a microwave oven, for a sufficiently large unit area, the continuous layer of microwave interactive material will provide more heat than the patterned layer of microwave interactive material.

Third Embodiment

Figure 5:
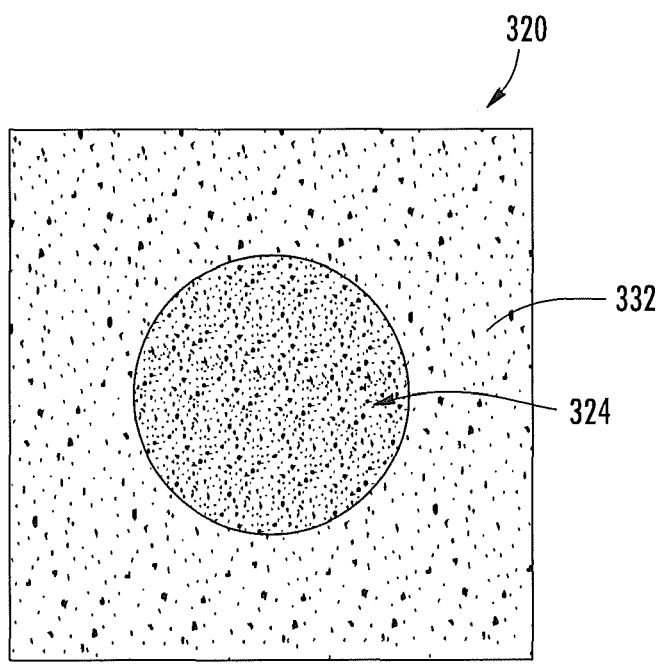
FIG. 5 is an isolated, schematic top plan view of a bottom panel/susceptor that can be placed upon a disk-shaped tray of a turntable in a microwave oven, in accordance with a third embodiment of the present invention.

FIG. 5 illustrates a bottom panel 320 of a third embodiment of the present invention. The second and third embodiments are alike, except for variations noted and variations that will be apparent to those of ordinary skill in the art.

The upper surface of the lower support layer (e.g., see the lower support layer 130 shown in FIG. 3C) of the bottom panel 320 includes a circular central region 324 that is entirely covered with a continuous layer of microwave interactive material (e.g., see the continuous layer of microwave interactive material 125 shown in FIG. 3C). The continuous layer of microwave interactive material is schematically represented by the relatively heavy stippling in FIG. 5. The central region 324 is surrounded by a marginal region 332 that extends between the periphery of the central region 324 and the edges of the bottom panel 320. More specifically, the marginal region 332 extends between the periphery of the continuous layer of microwave interactive material and the edges of the bottom panel 320. The entire marginal region 332 of the upper surface of the lower support layer of the bottom panel 320 is covered with a patterned layer of microwave interactive material. The patterned layer of microwave interactive material is schematically represented by the relatively light stippling in FIG. 4. The patterned layer of microwave interactive material can be like that illustrated in FIG. 3D, although other patterns are also within the scope of the present invention. Whereas the periphery of the marginal region 332 is shown as being in the form of a parallelogram, namely a rectangle and more specifically a square, the periphery of the marginal region 332 can alternatively be circular or other shapes.

FIG. 5 is also schematically illustrative of a susceptor in isolation. The support layer (e.g., see the support layer 127 of FIG. 3C) of the susceptor can, in a plan view, correspond in shape and size to the bottom panel 320. The support layer of the susceptor has a central region 324, which is entirely covered with the continuous layer of microwave interactive material (e.g., see the microwave interactive material 125 of FIG. 3C), and a marginal region 332, which is entirely covered with the patterned layer of microwave interactive material. The patterned layer of microwave interactive material can be in the form of a wide variety of different patterns such as, but not limited to, the grid pattern shown in FIG. 3D.

Fourth Embodiment

Figure 6:
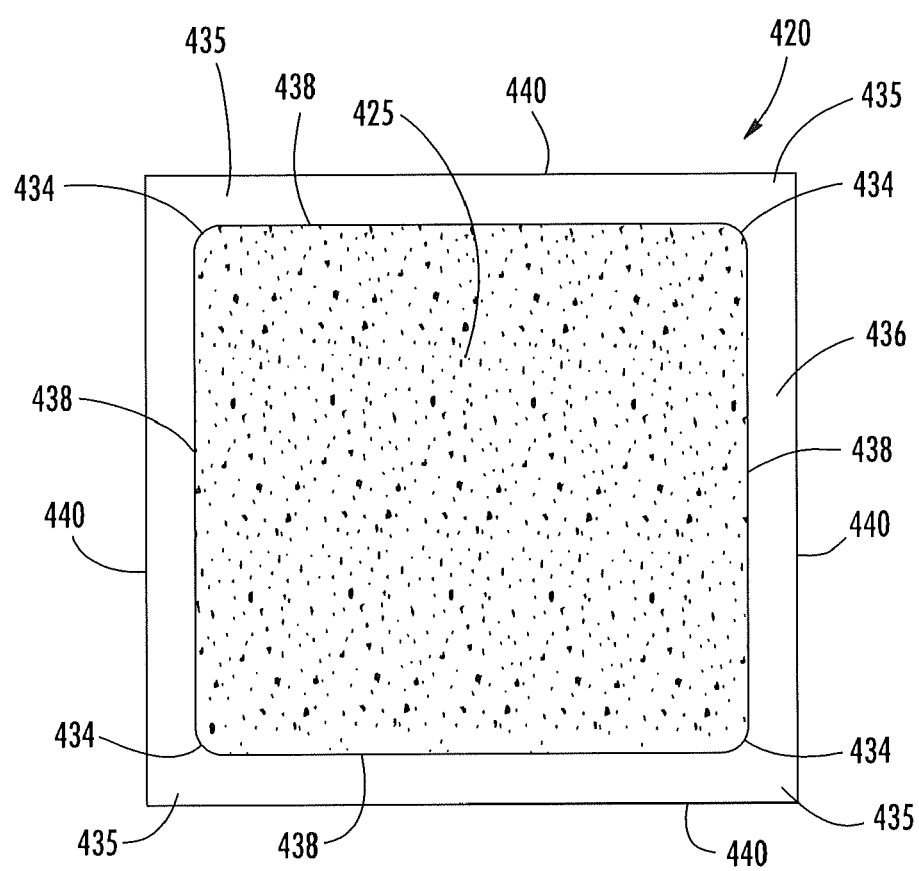
FIG. 6 is an isolated, schematic top plan view of a bottom panel/susceptor that can be placed upon a disk-shaped tray of a turntable in a microwave oven, in accordance with a fourth embodiment of the present invention.

FIG. 6 illustrates a bottom panel 420 of a fourth embodiment of the present invention. The first and fourth embodiments are alike, except for variations noted and variations that will be apparent to those of ordinary skill in the art.

A central region 425 of the lower support layer (e.g., see the lower support layer 130 shown in FIG. 3C) of the bottom panel 420 is entirely covered with a continuous layer of microwave interactive material (e.g., see the continuous layer of microwave interactive material 125 shown in FIG. 3C). The continuous layer of microwave interactive material is schematically represented by stippling in FIG. 6. The central region 425 (i.e., the continuous layer of microwave interactive material) can be characterized as being in the form of a polygon, more specifically a parallelogram, namely a square, that is smaller than the overall size of the lower support layer of the bottom panel 420 and optionally has beveled corners 434. More specifically, the beveled corners 434 are defined by the peripheral edge of the continuous layer of microwave interactive material. The beveled corners 434 are respectively recessed from outer portions of corner regions 435 of the lower support layer of the bottom panel 420.

The central region 425 is surrounded by a marginal region 436 that includes the corner regions 435. The marginal region 436 is absent of microwave interactive material. The central region 425 (i.e., the continuous layer of microwave interactive material) includes peripheral edges 438 that respectively extend between the corners 434 of the central region. The edges 438 and corners 434 of the central region 435 define the inner periphery of the marginal region 436. The edges 440 of the lower support layer (e.g., see the lower support layer 130 shown in FIG. 3C) of the bottom panel 420 define the outer periphery of the marginal region 436.

As shown in FIG. 6, the edges 438 of the central region 425 respectively extend along the edges 440 of the lower support layer of the bottom panel 420. More specifically, the edges 438 of the central region 425 are respectively parallel to (e.g., substantially parallel to), and spaced apart from (e.g., substantially spaced apart from), the edges 440 of the lower support layer of the bottom panel 420.

More specifically referring to the beveled corners 434, they are defined by the peripheral edge of the layer of microwave interactive material. In accordance with the fourth embodiment of the present invention, the subject "beveling" of the beveled corners 434 is seen in the plan view of FIG. 6; in the plan view the substantially straight peripheral edges 438 of the central region 425 do not respectively meet at 90 degrees because of the beveled corners 434 being respectively positioned between the substantially straight peripheral edges 438.

FIG. 6 is also schematically illustrative of a susceptor in isolation. The support layer (e.g., see the support layer 127 of FIG. 3C) of the susceptor can, in a plan view, correspond in shape and size to the bottom panel 420. The support layer of the susceptor has a central region 425, which is entirely covered with the continuous layer of microwave interactive material (e.g., see the microwave interactive material 125 of FIG. 3C), and a marginal region 436, which is absent of microwave interactive material.

In accordance with a variation of the fourth embodiment, the central region 425 (i.e., the continuous layer of microwave interactive material) is in the form of a polygon, more specifically a parallelogram, namely a square, that is smaller than the bottom panel 420 and does not include the beveled corners 434.

Fifth Embodiment

Figure 7:
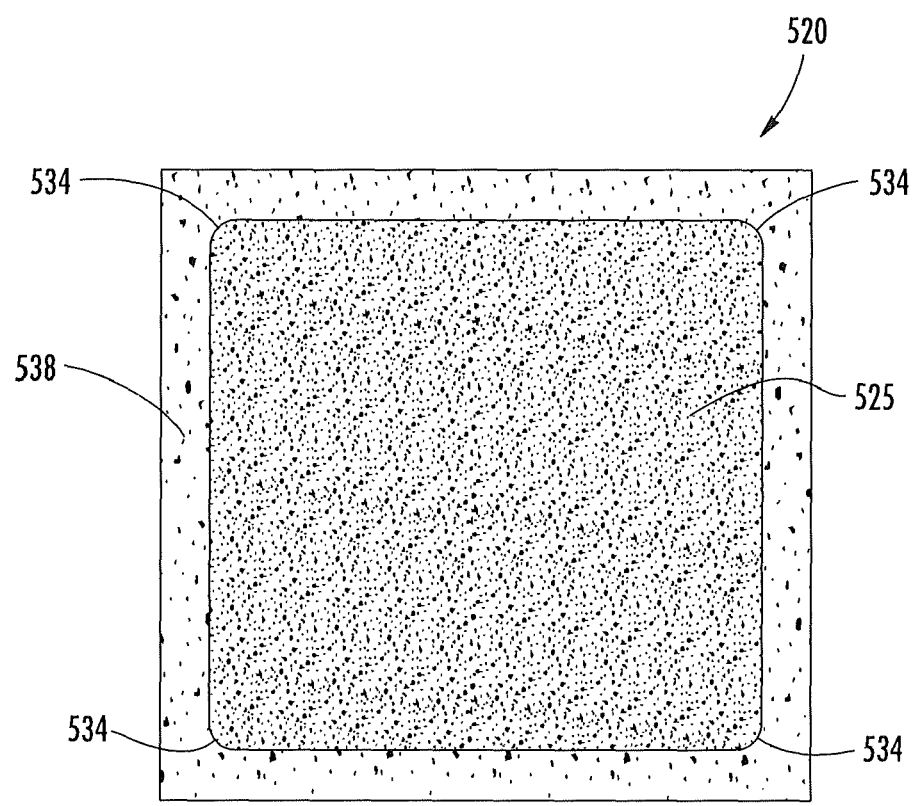
FIG. 7 is an isolated, schematic top plan view of a bottom panel/susceptor that can be placed upon a disk-shaped tray of a turntable in a microwave oven, in accordance with a fifth embodiment of the present invention.

FIG. 7 illustrates a bottom panel 520 of a fifth embodiment of the present invention. The fourth and fifth embodiments are alike, except for variations noted and variations that will be apparent to those of ordinary skill in the art.

In addition to the central region 525 of the upper surface of the lower support layer (e.g., see the lower support layer 130 shown in FIG. 3C) of the bottom panel 520 being entirely covered with the continuous layer of microwave interactive material (e.g., see the continuous layer of microwave interactive material shown in FIG. 3C), the marginal region 538 of the upper surface of the lower support layer of the bottom panel 520 is entirely covered with a patterned layer of microwave interactive material. The continuous layer of microwave interactive material is schematically represented by the relatively heavy stippling in FIG. 7. The patterned layer of microwave interactive material can be as described above, and it is schematically represented by relatively light stippling in FIG. 7. The beveled corners 534, which are defined by respective portions of the periphery of the continuous layer of microwave interactive material, can optionally be included.

FIG. 7 is also schematically illustrative of a susceptor in isolation. The support layer (e.g., see the support layer 127 of FIG. 3C) of the susceptor can, in a plan view, correspond to the shape of the bottom panel 520. The support layer of the susceptor has a central region 525, which is entirely covered with the continuous layer of microwave interactive material, and a marginal region 538, which is entirely covered with the patterned layer of microwave interactive material. The beveled corners 534 can optionally be included.

Sixth Embodiment

Figure 8:
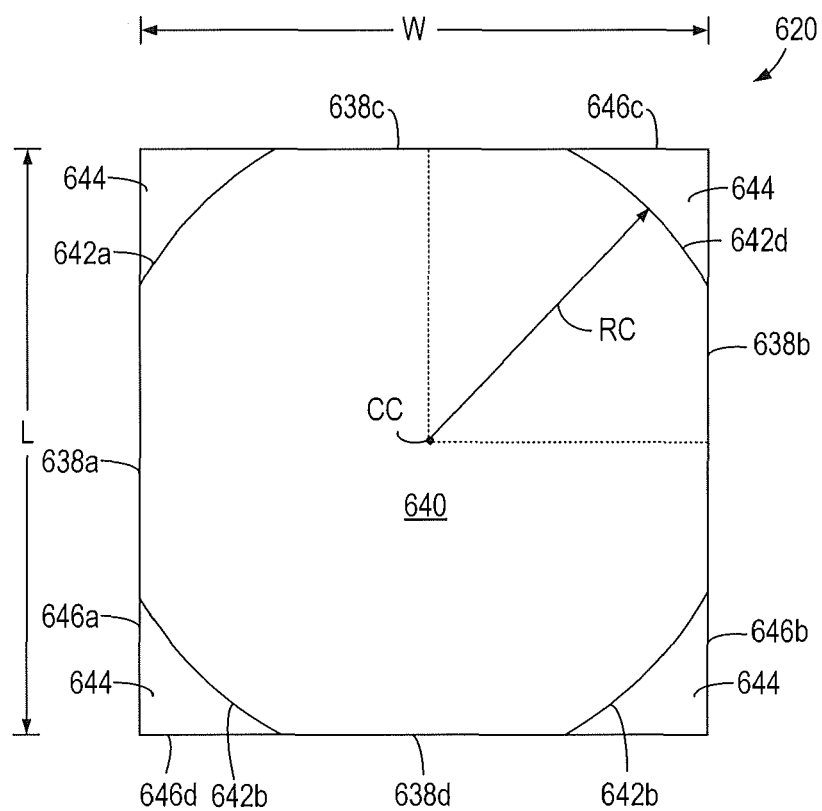
FIG. 8 is an isolated, schematic top plan view of a bottom panel/susceptor that can be placed upon a disk-shaped tray of a turntable in a microwave oven, in accordance with a sixth embodiment of the present invention.

FIG. 8 illustrates a bottom panel 620 of a sixth embodiment of the present invention. The first and sixth embodiments are alike, except for variations noted and variations that will be apparent to those of ordinary skill in the art.

A central region 640 of the upper surface of the lower support layer (e.g., see the lower support layer 130 shown in FIG. 3C) of the bottom panel 620 is entirely covered with a continuous layer of microwave interactive material (e.g., see the layer of microwave interactive material 125 shown in FIG. 3C). In addition, the central region 640 (i.e., the layer of microwave interactive material) can be characterized as being in the form of a polygon, more specifically a parallelogram, namely a square, that has beveled corners 642a, 642b, 642c, 642d. The bottom panel 620 includes corner regions 644 that are absent of microwave interactive material. More specifically, the upper surface of the lower support layer of the bottom panel 620 includes corner regions 644 that are absent of (e.g., not covered with) microwave interactive material. In accordance with the sixth embodiment of the present invention, each of the beveled corners 642a, 642b, 642c, 642d is defined by a radius of curvature having a center of curvature located at the center of the bottom panel 620. The center of curvature CC and a representative one of the radiuses of curvature RC are schematically shown in FIG. 8.

In a first version of the sixth embodiment, the corner regions 644 are absent of microwave interactive material. Therefore, there is a general resemblance between the first embodiment, which is illustrated in FIG. 1, and the first version of the sixth embodiment. This general resemblance is discussed in greater detail below.

In a second version of the sixth embodiment, each of the corner regions 644 of the upper surface of the lower support layer of the bottom panel 620 is entirely covered with a patterned layer of microwave interactive material (the patterned layer of microwave interactive material can be like that illustrated in FIG. 3D, although other patterns are also within the scope of the present invention). Therefore, there is a general resemblance between the second embodiment, which is illustrated in FIG. 4, and the second version of the sixth embodiment. This general resemblance is also discussed in greater detail below.

The central region 640 (i.e., the continuous layer of microwave interactive material) includes edges 638a, 638b, 638c, 638d that respectively extend between the corners 642a, 642b, 642c, 642d of the central region. The edges 638a, 638b, 638c, 638d and corners 642a, 642b, 642c, 642d of the central region 640 define the periphery of the central region. As shown in FIG. 8, the edges 638a, 638b, 638c, 638d of the central region 640 respectively extend along the edges 646a, 646b, 646c, 646d of the lower support layer of the bottom panel 620. More specifically, the edges 638a, 638b, 638c, 638d of the central region 640 are respectively parallel to the edges 646a, 646b, 646c, 646d of the lower support layer of the bottom panel 620. Even more specifically, the edges 638a, 638b, 638c, 638d of the central region 640 are respectively vertically aligned with the edges 646a, 646b, 646c, 646d of the lower support layer of the bottom panel 620 in a plan view of the bottom panel 620.

FIG. 8 is also schematically illustrative of a susceptor in isolation. The support layer (e.g., see the support layer 127 of FIG. 3C) of the susceptor can, in a plan view, correspond in shape and size to the bottom panel 620. The support layer of the susceptor has a central region 640, which is entirely covered with the microwave interactive material, and corner regions 644. In a first version of the susceptor, the corner regions 644 of the support layer are absent of microwave interactive material. In a second version of the susceptor, the corner regions 644 of the support layer of the susceptor are each entirely covered with a patterned layer of microwave interactive material. The patterned layer of microwave interactive material can be in the form of a wide variety of different patterns such as, but not limited to, the grid pattern shown in FIG. 3D.

In accordance with one example of the sixth embodiment of the present invention, the susceptor/bottom panel 620 has a length L and a width W that are perpendicular to each other, and each is about 180 millimeters. In accordance with other examples of the sixth embodiment, at least one of the length L and width W are, or both of the length L and width W are, at least about 140 millimeters, or more specifically at least about 150 millimeters, or more specifically at least about 160 millimeters, or more specifically at least about 170 millimeters, or more specifically about 180 millimeters. Other dimensions are also within the scope of the present invention. The lengths and widths of the susceptors/bottom panels 120, 220, 320, 420, 520 of the first through fifth embodiments can respectively be like the length L and width W of the susceptor/bottom panel 620 of the sixth embodiment.

As mentioned above, each of the beveled corners 642a, 642b, 642c, 642d is defined by a radius of curvature having a center of curvature located at, or about at, the center of the bottom panel 620. The center of curvature CC and a representative one of the radiuses of curvature RC are schematically shown in FIG. 8. In accordance with the sixth embodiment of the present invention, the radiuses of curvature RC are less than:

$$((0.5 \text{ multiplied by the length L})^2 \text{ plus } (0.5 \text{ multiplied by the width W})^2)^{0.5}$$

Stated in shorter form but mathematically identically, the radiuses of curvature RC of the sixth embodiment are less than a First Reference Value, where:

$$\text{First Reference Value} = (((0.5)(L))^2 + ((0.5)(W))^2)^{0.5}$$

where:
L is the length L of the susceptor/bottom panel 620, and
W is the width W of the susceptor/bottom panel 620.

In accordance with various examples of the sixth embodiment, the radiuses of curvature RC can be:
within a range from at least about half of the length L to less than the First Reference Value and/or
within a range from at least about half of the width W to less than the First Reference Value and/or
within a range of about 70.9% of the First Reference Value to about 94.5% of the First Reference Value and/or
within a range of about 78.7% of the First Reference Value to about 88.2% of the First Reference Value and/or
within a range of about 82.7% of the First Reference Value to about 86.6% of the First Reference Value.

Other radiuses of curvature and differently located centers of curvature are also within the scope of the present invention.

The dashed lines in FIG. 8 designate a quadrant of the susceptor/bottom panel 620, as discussed in greater detail below.

Seventh Embodiment

Figure 9:
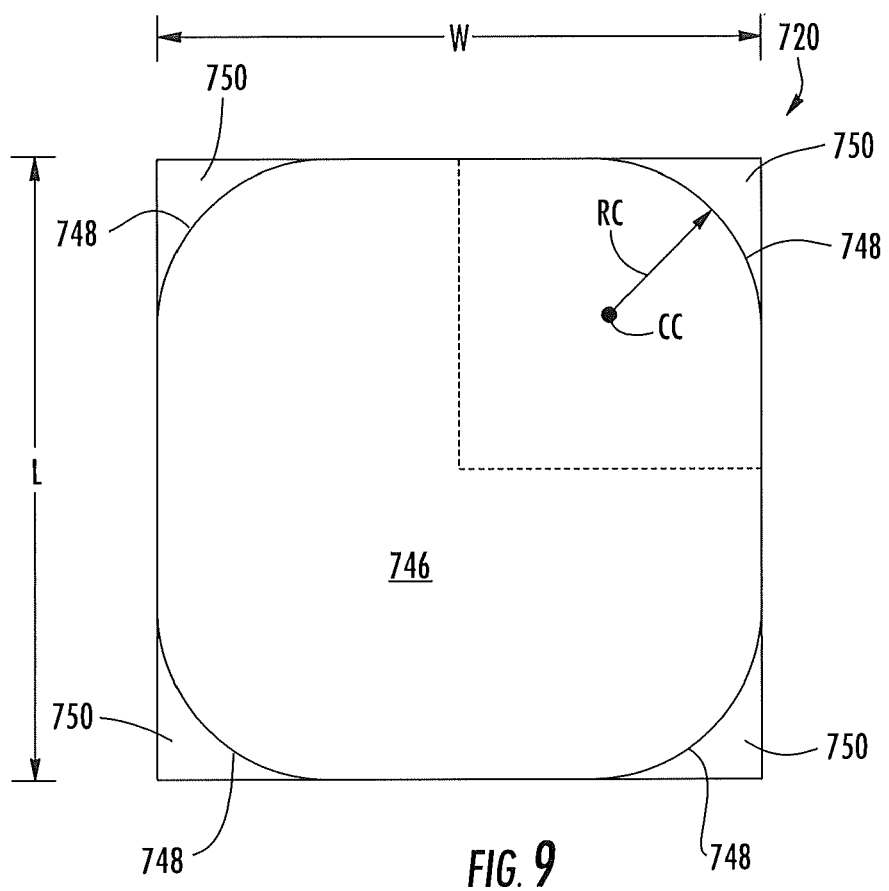
FIG. 9 is an isolated, schematic top plan view of a bottom panel/susceptor that can be placed upon a disk-shaped tray of a turntable in a microwave oven, in accordance with a seventh embodiment of the present invention.

FIG. 9 illustrates a bottom panel 720 of a seventh embodiment of the present invention. The sixth and seventh embodiments are alike, except for variations noted and variations that will be apparent to those of ordinary skill in the art.

A central region 746 of the upper surface of the lower support layer (e.g., see the lower support layer 130 shown in FIG. 3C) of the bottom panel 720 is entirely covered with a continuous layer of microwave interactive material (e.g., see the layer of microwave interactive material 125 shown in FIG. 3C). In addition, the central region 746 (i.e., the layer of microwave interactive material) can be characterized as being in the form of a polygon, more specifically a parallelogram, namely a square, that has beveled corners 748. The bottom panel 720 includes the corner regions 750 that are absent of microwave interactive material. More specifically, the upper surface of the lower support layer of the bottom panel 720 includes corner regions 750 that are absent of (e.g., not covered with) microwave interactive material.

In accordance with the seventh embodiment, each of the beveled corners 748 is defined by a radius of curvature having a center of curvature located at the center of the quadrant of the bottom panel 720 in which the beveled corner is located. As a result, each beveled corner 748 is in the shape of a quarter of a circle. For example, the dashed lines in FIG. 9 designate one of the quadrants of the bottom panel 720, as will be discussed in greater detail below.

In a first version of the seventh embodiment, each of the corner regions 750 is absent of microwave interactive material. In a second version of the seventh embodiment, each of the corner regions 750 of the upper surface of the lower support layer is entirely covered with a patterned layer of microwave interactive material. The patterned layer of microwave interactive material can be like that illustrated in FIG. 3D, although other patterns are also within the scope of the present invention.

FIG. 9 is also schematically illustrative of a susceptor in isolation. The support layer (e.g., see the support layer 127 of FIG. 3C) of the susceptor can, in a plan view, correspond in shape and size to the bottom panel 720. The support layer of the susceptor has a central region 746, which is entirely covered with the microwave interactive material, and corner regions 750. In a first version of the susceptor, the corner regions 750 of the support layer of the susceptor are absent of microwave interactive material. In a second version of the susceptor, the corner regions 750 of the support layer of the susceptor are each entirely covered with the patterned layer of microwave interactive material.

In accordance with one example of the seventh embodiment of the present invention, the susceptor/bottom panel 720 has a length L and a width W that are perpendicular to each other, and each is about 180 millimeters. In accordance with other examples of the seventh embodiment, at least one of length L and width W are, or both of the length L and width W are, at least about 140 millimeters, or more specifically at least about 150 millimeters, or more specifically at least about 160 millimeters, or more specifically at least about 170 millimeters, or more specifically about 180 millimeters. Other dimensions are also within the scope of the present invention.

As mentioned above, each of the beveled corners 748 is defined by a radius of curvature having a center of curvature located at the center of the quadrant of the bottom panel 720 in which the beveled corner is located. As a result, each beveled corner 748 is in the shape of a quarter of a circle. For a representative one of the beveled corners 748, the center of curvature CC and radiuses of curvature RC are schematically shown in FIG. 9. In accordance with the seventh embodiment of the present invention the radiuses of curvature RC are less than:

$$((0.25 \text{ multiplied by the length L})^2 \text{ plus } (0.25 \text{ multiplied by the width W})^2)^{0.5}.$$

Stated in shorter form but mathematically identically, the radiuses of curvature RC of the seventh embodiment are less than a Second Reference Value, where:

$$\text{Second Reference Value} = (((0.25)(L))^2 + ((0.25)(W))^2)^{0.5}$$

where:
L is the length L of the susceptor/bottom panel 720, and
W is the width W of the susceptor/bottom panel 720.

In accordance with various examples of the seventh embodiment, the radiuses of curvature RC can be:
- within a range from at least about a fourth of the length L to less than the Second Reference Value and/or
- within a range from at least about a fourth of the width W to less than the Second Reference Value.

Other radiuses of curvature are also within the scope of the present invention. As one example and in accordance with an alternative embodiment of the present invention, the radiuses of curvature can be in a range from, or about from, any of the values specified for the seventh embodiment to less than the First Reference Value.

Eighth Embodiment

Figure 10:
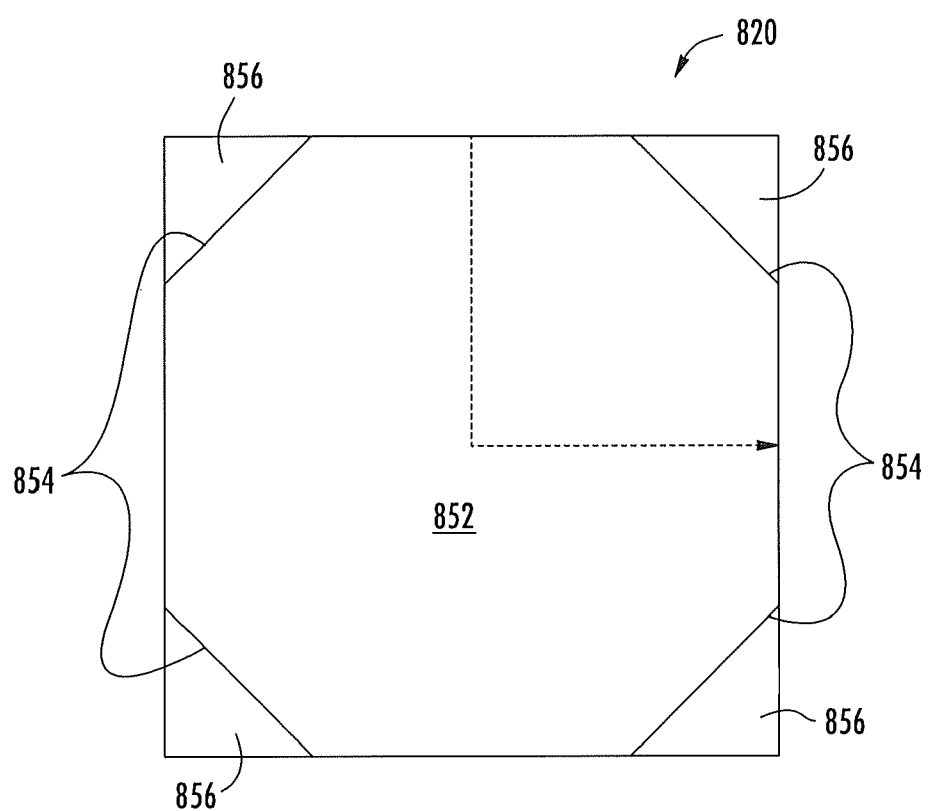
FIG. 10 is an isolated, schematic top plan view of a bottom panel/susceptor that can be placed upon a disk-shaped tray of a turntable in a microwave oven, in accordance with an eighth embodiment of the present invention.

FIG. 10 is illustrative of a bottom panel 820 of an eighth embodiment of the present invention. The sixth and eighth embodiments of the present invention are alike, except for variations noted and variations that will be apparent to those of ordinary skill in the art.

A central region 852 of the upper surface of the lower support layer (e.g., see the lower support layer 130 shown in FIG. 3C) of the bottom panel 820 is entirely covered with a continuous layer of microwave interactive material (e.g., see the continuous layer of microwave interactive material 125 shown in FIG. 3C). The central region 852 (i.e., the layer of microwave interactive material) can be characterized as being in the form of a polygon, more specifically a parallelogram, namely a square, that has diagonal beveled corners 854. The diagonal beveled corners 854 extend obliquely with respect to the other edges illustrated in FIG. 10. The lower support layer of the bottom panel 820 includes corner regions 856 that are absent of microwave interactive material. More specifically, the upper surface of the lower support layer of the bottom panel 820 includes corner regions 856 that are absent of (e.g., not covered with) microwave interactive material.

In a first version of the eighth embodiment, each of the corner regions 856 is absent of microwave interactive material. In a second version of the eighth embodiment, each of the corner regions 856 of the upper surface of the lower support layer is entirely covered with a patterned layer of microwave interactive material. The patterned layer of microwave interactive material can be like that illustrated in FIG. 3D, although other patterns are also within the scope of the present invention.

FIG. 10 is also schematically illustrative of a susceptor in isolation. The support layer (e.g., see the support layer 127 of FIG. 3C) of the susceptor can, in a plan view, correspond in shape and size to the bottom panel 820. The support layer of the susceptor has a central region 852, which is entirely covered with the microwave interactive material, and corner regions 856. In a first version of the susceptor, the corner regions 856 are absent of microwave interactive material. In a second version of the susceptor, the corner regions 856 of the support layer of the susceptor are each entirely covered with a patterned layer of microwave interactive material. The patterned layer of microwave interactive material can be like that illustrated in FIG. 3D, although other patterns are also within the scope of the present invention.

The lengths and widths of the susceptors/bottom panel 820 of the eighth embodiment can respectively be like the length L and width W of the susceptor/bottom panel 720 of the seventh embodiment. As shown in FIG. 10, each corner region 856 is a right triangle that occupies 3.125% of the overall area of the susceptor/bottom panel 820. More generally, each corner region 856 can be at least about a right triangle that occupies about 3.125% of the overall area of the susceptor/bottom panel 820. Even more generally, each corner region 856 can occupy anywhere from about 2.8% of the overall area of the susceptor/bottom panel 820 to about 3.4% of the overall area of the susceptor/bottom panel 820. Even more generally, each corner region 856 can occupy anywhere from about 2.5% of the overall area of the susceptor/bottom panel 820 to about 3.75% of the overall area of the susceptor/bottom panel 820. Even more generally, each corner region 856 can occupy anywhere from about 2.2% of the overall area of the susceptor/bottom panel 820 to about 4.1% of the overall area of the susceptor/bottom panel 820. Other percentages are also within the scope of the present invention.

The dashed lines in FIG. 10 designate a quadrant of the susceptor/bottom panel 820, as discussed in greater detail below.

Exemplary Comparisons and Additional Embodiments

The susceptor of the bottom panel 20 illustrated in FIG. 1 can be characterized as a baseline susceptor. Solely for the sake of comparison, the susceptors of the bottom panels 120, 220, 320, 420, 520, 620, 720, 820 respectively illustrated in FIGS. 3A and 4-10 can be considered to be the same overall size as, and constructed in the same manner as, the baseline susceptor of the bottom panel 20 illustrated in FIG. 1, except for having the different arrangements of microwave interactive material as discussed above.

Based upon a theoretical comparison between the baseline susceptor of the bottom panel 20 illustrated in FIG. 1 and the susceptors of the bottom panels 120, 220, 320, 420, 520, 620, 720, 820 respectively illustrated in FIGS. 3A and 4-10, it is apparent that the susceptors of the bottom panels 120, 220, 320, 420, 520, 620, 720, 820 have the potential to decrease the thermally induced stresses in turntable trays. For example and for comparison with FIGS. 2A-G, FIGS. 11-13 are schematic illustrations that respectively show theoretical thermally induced stress in quadrants of turntable trays 622, 722, 822 (e.g., trays that are at least generally round) that respectively have thereon quadrants of the first versions of the susceptors of the bottom panels 620, 720, 820 shown in FIGS. 8-10. For each of the FIGS. 11-13, the contrasting crosshatching is illustrative of theoretical thermally induced stress in the respective turntable tray 622, 722, 822 (e.g., see the legends of FIGS. 2A-G for an understanding of how the contrasting crosshatching is illustrative of the stress).

As an example of why FIGS. 2A-G and FIGS. 11-13 are theoretical, it is noted that turntable trays typically include an upturned lip at their periphery, and such upturned lips were not taken into consideration when theoretically calculating the thermally induced stress shown in FIGS. 2A-G and FIGS. 11-13. Also, uniform contact between the susceptors and trays was considered to exist in the theoretical calculations. The upturned lips can play a significant role in the interaction between susceptors, or the like, and associated turntable trays, because when a susceptor is upon an upturned lip there is typically less than uniform contact between the susceptor and the tray, due to the susceptor being elevated above a portion of the tray. Susceptors can also be elevated, or partially elevated, above turntable trays by way of other mechanisms, such as by way of elevating mechanisms that are built into the constructs that contain the susceptor. As one example, it is contemplated that other microwave energy interactive structures may be used for the elevating, such as, but not limited to, the microwave energy interactive insulating materials described in PCT Application No. PCT/US03/03779, U.S. application Ser. No, 10/501,003, and U.S. application Ser. No. 11/314,851, each of which is entirely incorporated herein by reference. That is and for example, susceptors and other constructs of the present invention can be elevated, or at least partially elevated, above turntable trays.

Figure 11:
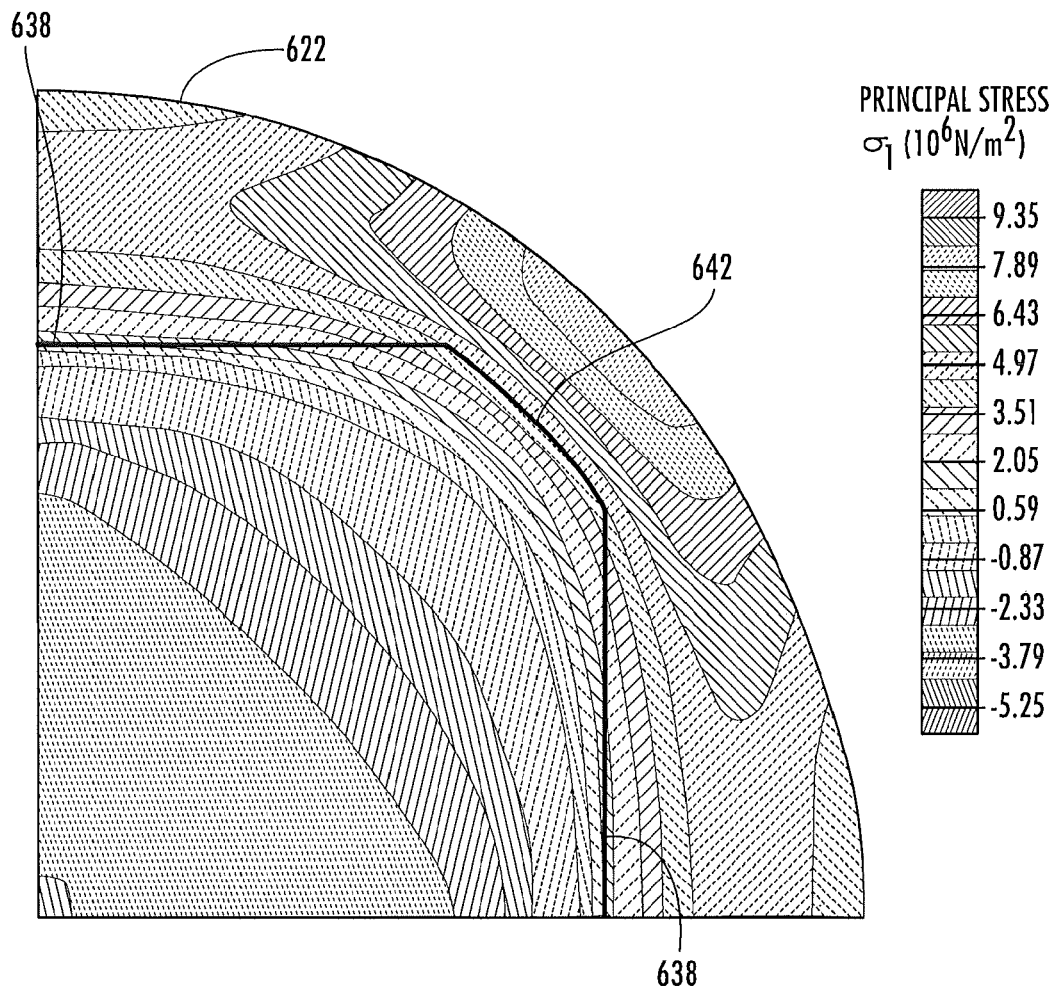
FIG. 11 schematically and partially illustrates theoretical thermally induced stress in a turntable tray, in accordance with an exemplary method of using the bottom panel/susceptor of the sixth embodiment of the present invention.
Figure 12:
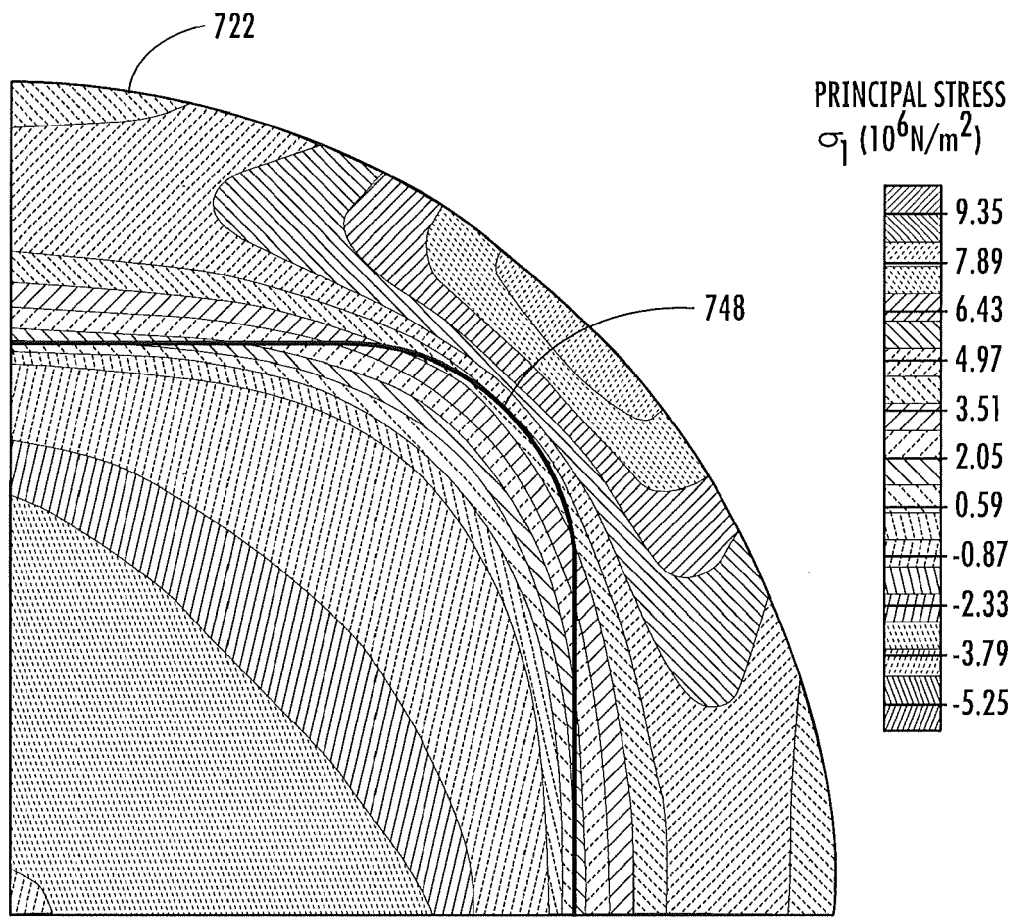
FIG. 12 schematically and partially illustrates theoretical thermally induced stress in a turntable tray, in accordance with an exemplary method of using the bottom panel/susceptor of the seventh embodiment of the present invention.
Figure 13:
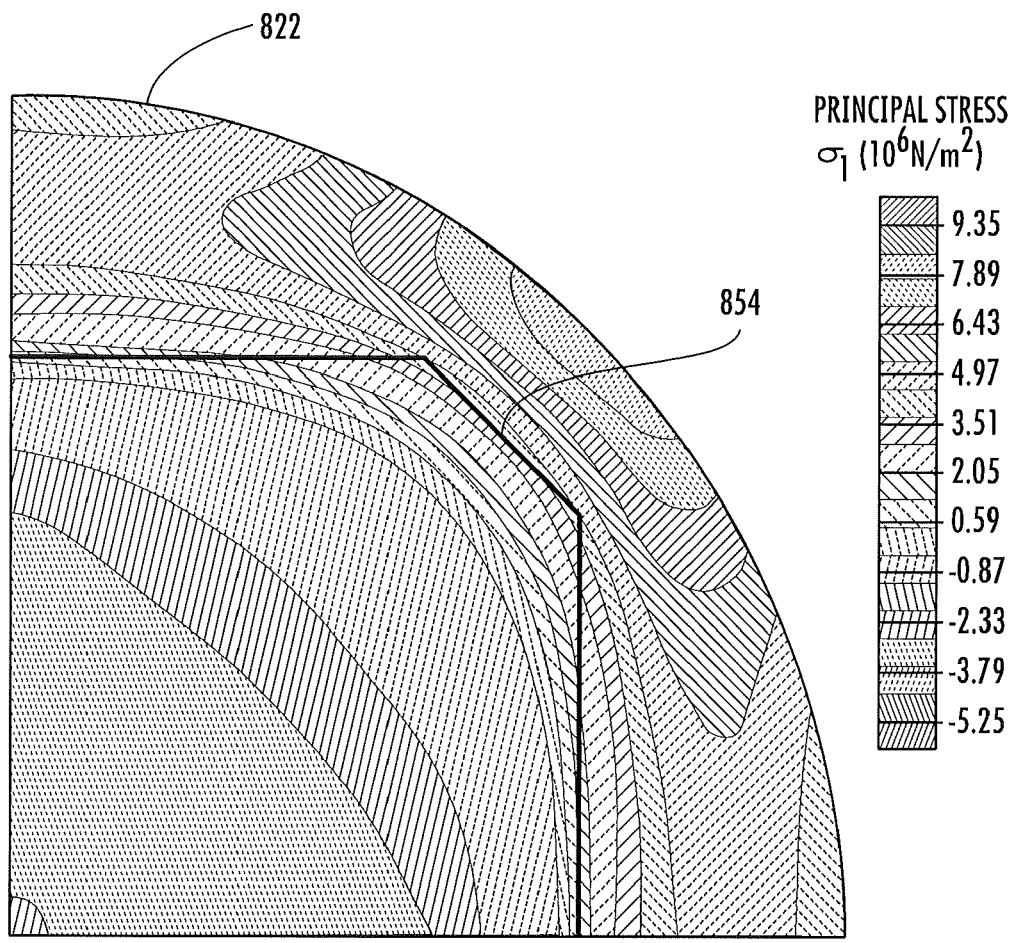
FIG. 13 schematically and partially illustrates theoretical thermally induced stress in a turntable tray, in accordance with an exemplary method of using the bottom panel/susceptor of the eighth embodiment of the present invention.

FIGS. 11-13 respectively schematically show the locations of the quadrants of the susceptors of the bottom panels 620, 720, 820 upon the turntable trays 622, 722, 822. More specifically, the relatively dark lines in FIG. 11 represent the periphery (i.e., the edges 638 and beveled corner 642) of the continuous layer of microwave interactive material in the quadrant of the susceptor of the bottom panel 620. Similarly, the relatively dark lines in FIG. 12 represent the periphery (including the beveled corner 748) of the continuous layer of microwave interactive material in the quadrant of the susceptor of the bottom panel 720. Similarly, the relatively dark lines in FIG. 12 represent the periphery (including the beveled corner 854) of the continuous layer of microwave interactive material in the quadrant of the susceptor of the bottom panel 820. The illustrated thermally induced stresses are the result of the microwave interactive material of the susceptors of the bottom panels 620, 720, 820 absorbing microwave energy and thereby becoming hot and heating the turntable trays 622, 722, 822, respectively.

Not only do the susceptors illustrated in FIGS. 3A and 4-10 have the potential to advantageously decrease the thermally induced stresses in turntable trays as compared to the susceptor of the bottom panel 20 illustrated in FIG. 1, they can also impact cooking effectiveness. One aspect of the present invention relates to balancing the competing factors of cooking effectiveness and thermally induced stresses in turntable trays; it can be advantageous when designing susceptors to consider both of the competing effects of cooking effectiveness and thermally induced stresses in turntable trays.

In accordance with an aspect of the present invention, a mechanism for evaluating design changes is a figure of merit (FOM) defined by:

$$FOM = \frac{\text{Relative change in peak thermally induced stress}}{\text{Relative change in surface heating}}.$$

A high FOM suggests that a design change has produced a good thermally induced stress reduction at little expense to the overall heating performance. A low FOM suggests that the susceptor's cooking effectiveness has been lost for a modest stress reduction benefit. Using the FOM, different design concepts can be compared quantitatively.

More specifically and in accordance with an aspect of the present invention:

$$FOM = \frac{1 - \frac{S_n}{S_0}}{1 - \frac{\sum A_n \cdot P_n}{A_0 \cdot P_0}}$$

where:
$S_o$=Baseline thermally induced stress level
$A_n$=Area associated with a specific surface heating rate. (n=0 is the baseline case)
$S_n$=Thermally induced stress level with the novel design
$P_n$=Heating rate for a particular area The susceptor of the bottom panel 20 illustrated in FIG. 1 can be characterized as a baseline susceptor that is 180 millimeters by 180 millimeters. In the following, the susceptors of the first versions of the bottom panels 620, 720, 820 illustrated in FIGS. 8-10 are considered to be the same overall size as, and constructed in the same manner as, the baseline susceptor of the bottom panel 20 illustrated in FIG. 1, except for having the different arrangements of microwave interactive material as discussed above. The dashed lines in FIG. 1 designate a quadrant of the baseline susceptor of the bottom panel 20. Likewise, dashed lines in FIGS. 8-10 respectively designate quadrants of the susceptors of the bottom panels 620, 720, 820.

The following table (Table 1) provides a comparison between a quadrant of the baseline susceptor of the bottom panel 20 (FIG. 1) and quadrants of the susceptors of the first versions of the bottom panels 620, 720, 820 (FIGS. 8-10), with each being on one quadrant of a 260 millimeter diameter glass tray.

TABLE 1

| Design | Susceptor area per quadrant (mm$^2$) | Reduction in thermally induced stress (N/m$^2$) | FOM |
|---|---|---|---|
| susceptor of bottom panel 20 (FIG. 1) | 8100 | 0% | 0 |
| version 1 of susceptor of bottom panel 620 shown in FIG. 8 | 7656 | 13.5% | 2.45 |
| version 1 of susceptor of bottom panel 720 shown in FIG. 9 | 7659 | 13.5% | 2.45 |
| version 1 of susceptor of bottom panel 820 shown in FIG. 10 | 7657 | 12.5% | 2.27 |

As apparent from the above table, examples of the present invention can advantageously reduce thermally induced stress in turntable trays without unduly sacrificing susceptor effectiveness. As also apparent from the above table and regarding the FOM, version 1 of the susceptor of bottom panel 620 shown in FIG. 8, version 1 of the susceptor of bottom panel 720 shown in FIG. 9, and version 1 of the susceptor of bottom panel 820 shown in FIG. 10 each operate sufficiently similarly such that, for example, the beveled corners 854 (FIG. 10) can be characterized as operating as though they at least generally have a radius of curvature, and the corner regions 644, 750 (FIGS. 8 and 9) can be characterized as being at least generally rectangular (e.g., each of the corner regions 644, 750 can be very generally characterized as being a triangle with a hypotenuse that is not straight (e.g., is curved)). That is and very generally described, the straight beveled corners 854 shown in FIG. 10 can be characterized as operating in substantially the same manner as the rounded beveled corners 642, 748 respectively shown in FIGS. 8 and 9, and the rounded beveled corners 642, 748 respectively shown in FIGS. 8 and 9 can be characterized as operating in substantially the same manner as the straight beveled corners 854. Statements made in this Detailed Description section of this disclosure about similarities are for purposes of illustration and not for the purpose of narrowing the scope of the presentation, and they should not be construed as any sort of suggestion that different embodiments or species of the present invention are patentably indistinct.

Figure 14:
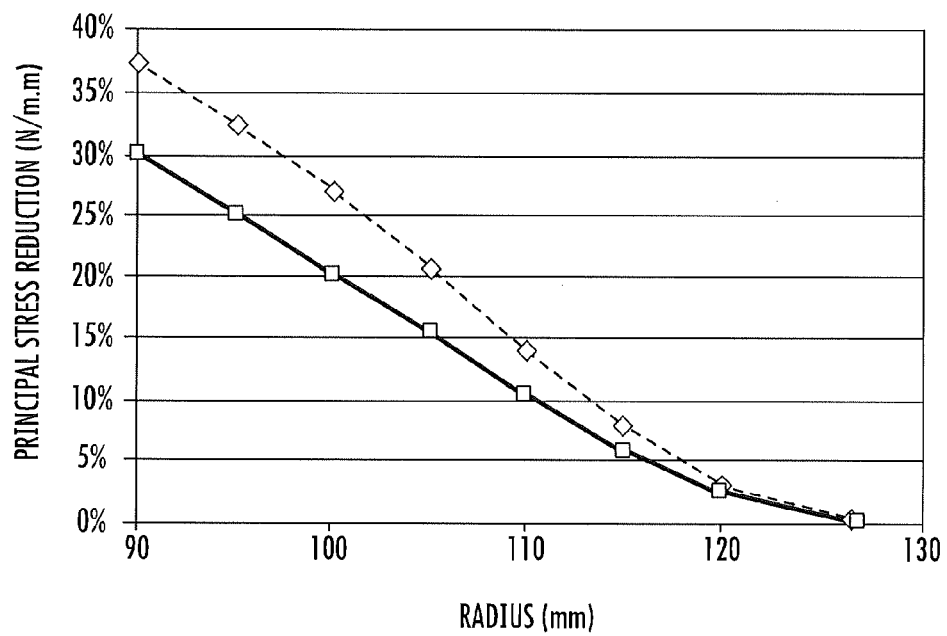
FIG. 14 is a chart that provides a first comparison between performance of bottom panels/susceptors in accordance with an aspect of the present invention.
Figure 15:
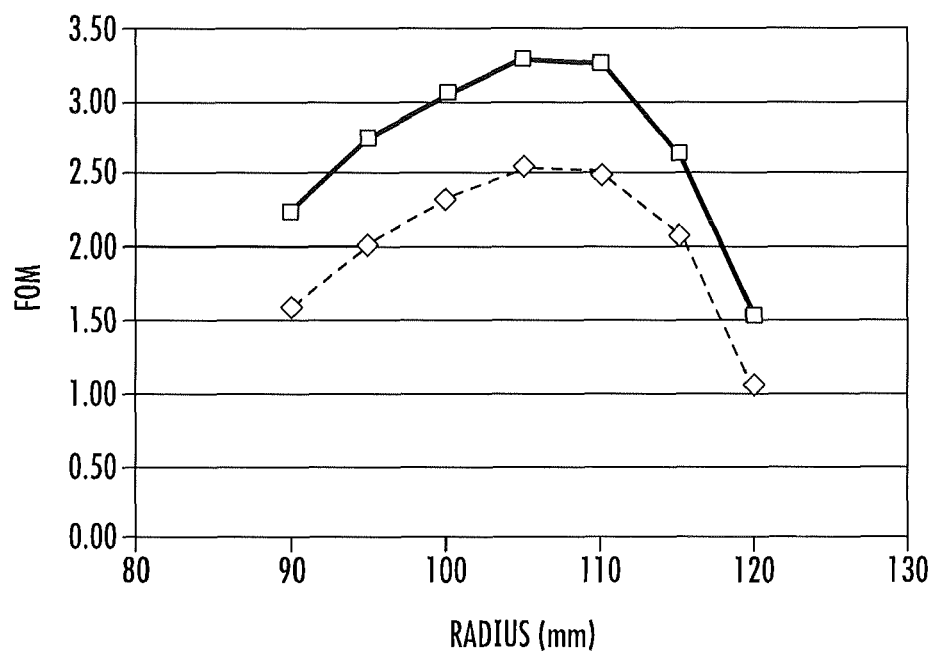
FIG. 15 is a chart that provides a second comparison between performance of bottom panels/susceptors that are compared in FIG. 14, in accordance with an aspect of the present invention.

FIGS. 14 and 15 are charts that provide comparisons between susceptors, in accordance with an aspect of the present invention. Generally described, FIGS. 14 and 15 illustrate theoretical computations run for the sixth embodiment of the present invention with varying radii both as the first version of the sixth embodiment (e.g., a "plain susceptor" with various beveled corners) and the second version of the sixth embodiment (e.g., a "plain susceptor/Focus QUIK-WAVE brand susceptor combination" with various beveled corners).

More specifically, in each of FIGS. 14 and 15, the data points represented as diamonds are for a First Series of Susceptors (e.g., "plain susceptors" with various beveled corners). Each susceptor of the First Series of Susceptors is 180 millimeters by 180 millimeters, and like the first version of the susceptor of the bottom panel 620 (FIG. 8) of the sixth embodiment in that any beveled corners (e.g., like the beveled corners 642 of FIG. 8) are defined by a radius of curvature having a center of curvature located at the center of the susceptor (e.g., at the center of the susceptor of the bottom panel 620). The difference between the susceptors of the First Series of Susceptors is that they each have a different radius of curvature for defining any beveled corners (e.g., beveled corners 642). For example, the First Series of Susceptors includes:

- a susceptor that is 180 millimeters by 180 millimeters and otherwise like the first version of the susceptor of the bottom panel 620 of FIG. 8;
- a susceptor that is 180 millimeters by 180 millimeters and otherwise like the baseline susceptor of the bottom panel 20 of FIG. 1 (i.e., a susceptor that is 180 millimeters by 180 millimeters and otherwise like the first version of the susceptor of the bottom panel 620 of FIG. 8, except that the radius of curvature (for defining any beveled corners) is 127 millimeters); and
- a susceptor that is 180 millimeters by 180 millimeters and otherwise like the susceptor of the bottom panel 120 of FIG. 3A (i.e., a susceptor that is 180 millimeters by 180 millimeters and otherwise like the first version of the susceptor of the bottom panel 620 of FIG. 8, except that the radius of curvature (for defining beveled corners) is 90 millimeters).

In each of FIGS. 14 and 15, the data points represented as squares are for a Second Series of Susceptors (e.g., a "plain susceptor/Focus QUIKWAVE brand susceptor combinations" with various beveled corners). Each susceptor of this series is 180 millimeters by 180 millimeters, and like the second version of the susceptor of the bottom panel 620 (FIG. 8) of the sixth embodiment in that any beveled corners (e.g., like the beveled corners 642 of FIG. 8) are defined by a radius of curvature having a center of curvature located at the center of the susceptor (e.g., at the center of the susceptor of the bottom panel 620). The difference between the susceptors of the Second Series of Susceptors is that they each have a different radius of curvature for defining any beveled corners (e.g., beveled corners 642). For example, the Second Series of Susceptors includes:

- a susceptor that is 180 millimeters by 180 millimeters and otherwise like the second version of the susceptor of the bottom panel 620 of FIG. 8;
- a susceptor that is 180 millimeters by 180 millimeters and otherwise like the baseline susceptor of the bottom panel 20 of FIG. 1 (i.e., a susceptor that is 180 millimeters by 180 millimeters and otherwise like the second version of the susceptor of the bottom panel 620 of FIG. 8, except that the radius of curvature (for defining any beveled corners) is 127 millimeters); and
- a susceptor that is 180 millimeters by 180 millimeters and otherwise like the susceptor of the bottom panel 220 of FIG. 4 (i.e., a susceptor that is 180 millimeters by 180 millimeters and otherwise like the second version of the susceptor of the bottom panel 620 of FIG. 8, except that the radius of curvature (for defining beveled corners) is 90 millimeters).

As apparent from FIG. 14, as a general rule and for comparable susceptors, beveling (e.g., rounding) the corners of microwave interactive material can reduce thermally induced stress in turntable trays, and thereby reduce the occurrences of damaging turntable trays (e.g., causing them to fracture).

Although FIG. 14 is directed to rounding corners of continuous layers of microwave interactive material, it can also be advantageous to similarly bevel (e.g., round) corners of patterns of microwave interactive material. Accordingly, alternative embodiments of the present invention are directed to beveling corners of patterns of microwave interactive material, with that beveling corresponding to the herein described beveling of corners of continuous layers of microwave interactive material. As also apparent from FIG. 14, as a general rule and for comparable susceptors, the Second Series of Susceptors provides a lesser reduction in thermally induced stress than the First Series of Susceptors.

As apparent from FIG. 15, the Second Series of Susceptors is substantially more effective for cooking than the First Series of Susceptors, as indicated by the higher FOMs. Also apparent from FIG. 15, there is an optimum effectiveness (i.e. where the FOM is at a maximum); and for the embodiments illustrated by FIG. 15 the optimum effectiveness lies within a range of a radius of curvature of about 105 millimeters to a radius of curvature of about 110 millimeters. More generally, for the embodiments illustrated by FIG. 15 the optimum effectiveness lies within a range of a radius of curvature of about 99 millimeters to a radius of curvature of about 112 millimeters.

Whereas 260 millimeter diameter glass turntable trays and susceptors that are 180 millimeters by 180 millimeters are mentioned in the foregoing, a wide variety of different sizes are within the scope of the present invention. For example, it is typical for turntable trays to be as small as 9.5 inches and as large as 16.5 inches, and they can be a variety of sizes in between. Also, it is expected that differently sized turntable trays will be developed in the future, and such differently sized turntable trays are also within the scope of the present invention. In particular and as one example, it is expected that smaller microwave ovens with smaller turntable trays will be commercialized in the future.

The above-discussed turntable trays can be conventional, and constructed of material such as Pyrex brand glass. It is believed that some conventional turntable trays, which are suitable for use in accordance with the present invention, may have a tensile strength of about $7 \times 10^6$ N/m$^2$, or the like. Turntable trays made of glass typically have no plastic deformation; therefore, they will typically break, rather than deform, if the tensile strength is exceeded. Nonetheless, the susceptors and other constructs of the present invention can operate advantageously with a variety of different turntable trays, with different tensile strengths and other different characteristics. As at least generally mentioned above, one aspect of the present invention pertains to configuring layer(s) of microwave interactive material that cover a turntable tray in a microwave oven so that, with the microwave oven providing a typical amount of microwave energy for heating and/or cooking food within the microwave oven, thermally induced stress in the turntable tray is less than the tensile strength of the turntable tray. More specifically, it may be desirable for the layer(s) of microwave interactive material to be configured so that the thermally induced stress in the turntable tray is less than a percentage of the tensile strength of the turntable tray, with the percentage being about 98%, about 95%, about 90%, about 80%, or about 70% or less.

It will be understood by those skilled in the art that while the present invention has been discussed above with reference to exemplary embodiments, various additions, modifications and changes can be made thereto without departing from the spirit and scope of the invention as set forth in the following claims.

What is claimed is:

1. A method of heating food in a microwave oven having a disk-shaped turntable tray, the method comprising:
placing the food and a construct on the tray in the microwave oven, so that the tray is supporting the construct, and the construct is supporting the food, wherein
the construct comprises a susceptor that is supporting the food,
the susceptor comprises a layer of microwave interactive material mounted to a support layer,
the layer of microwave interactive material is operative for becoming hot when exposed to microwave energy,
the support layer is substantially polygonal-shaped, so that the support layer comprises a plurality of edges and a plurality of corners,
the food extends substantially to the edges of the support layer,
the layer of microwave interactive material comprises a plurality of edges and a plurality of beveled corners that are configured such that the layer of microwave interactive material is generally polygonal-shaped,
the layer of microwave interactive material extends substantially to the edges of the support layer, so that the edges of the layer of microwave interactive material are respectively substantially collinear with the edges of the support layer, comprising
the edges of the layer of microwave interactive material respectively being proximate the edges of the support layer, and
the edges of the layer of microwave interactive material respectively extending along the edges of the support layer,
the beveled corners of the layer of microwave interactive material are respectively adjacent the corners of the support layer,
each beveled corner is inwardly recessed from the respective adjacent corner of the support layer, so that a substantial portion of each of the corners of the support layer is not covered by the layer of microwave interactive material, and
the placing step comprises arranging the construct in a predetermined position on the tray so that each beveled corner is both proximate and inwardly recessed from an outer periphery of the tray; and
operating the microwave oven while the construct is in the predetermined position on the tray, so that
the layer of microwave interactive material is exposed to microwave energy and becomes hot,
the food is heated substantially to the edges of the support layer by the hot layer of microwave interactive material,
the tray is heated by the hot layer of microwave interactive material so that peak thermally induced stresses occur in the tray at locations proximate each beveled corner, and
each of the peak thermally induced stresses is less than a predetermined amount in response to each of the corners of the layer of microwave interactive material being beveled so that each of the corners of the layer of microwave interactive material is inwardly recessed from the outer periphery of the tray.

2. The method according to claim 1, further comprising providing the construct, wherein the providing step comprises:
optimizing effectiveness of the susceptor, comprising extending the layer of microwave interactive material substantially to the edges of the support layer, so that the edges of the layer of microwave interactive material are respectively substantially collinear with the edges of the support layer, comprising
the edges of the layer of microwave interactive material respectively being proximate the edges of the support layer, and
the edges of the layer of microwave interactive material respectively extending along the edges of the support layer; and
controlling stress in the tray, comprising omitting the layer of microwave interactive material from the substantial portion of each of the corners of the support layer, so that each beveled corner is inwardly recessed from the respective adjacent corner of the support layer.

3. The method according to claim 1, wherein the tray has a tensile strength, and the predetermined amount is the tensile strength, so that each of the peak thermally induced stresses is less than the tensile strength of the tray.

4. The method according to claim 1, wherein the arranging step comprises arranging the construct in the predetermined position on the tray so that each corner of the support layer is inwardly recessed from the outer periphery of the tray.

5. The method according to claim 1, wherein:
the construct is a carton;
the support layer is a polygonal bottom panel of the carton; and
the carton comprises side panels respectively extending upwardly from the edges of the bottom panel.

6. The method according to claim 1, wherein the layer of microwave interactive material has an optical density of less than about 0.5.

7. The method according to claim 1, wherein the layer of microwave interactive material has a thickness of less than about 200 angstroms.

8. The method according to claim 1, wherein inwardly of the outer periphery of the layer of microwave interactive material, the layer of microwave interactive material is substantially continuous throughout all of the area bounded by the outer periphery of the layer of microwave interactive material.

9. The method according to claim 3, wherein the layer of microwave interactive material comprises interspersed areas that are substantially transparent to microwave energy.

10. The method according to claim 1, wherein the layer of microwave interactive material extends to within about 0.1 inches of at least one of the edges of the support layer.

11. The method according to claim 1, wherein for each edge of the plurality of edges of the support layer, the layer of microwave interactive material extends to within about 0.1 inches of the edge.

12. The method according to claim 1, wherein each beveled corner is curved.

13. The method according to claim 1, wherein:
the layer of microwave interactive material is a first layer of microwave interactive material;
the susceptor further comprises a patterned layer of microwave interactive material that is operative for becoming hot when exposed to microwave energy; and
the patterned layer of microwave interactive material covers the corners of the support layer.

14. The method according to claim 13, wherein per unit area, the first layer of microwave interactive material is more absorbent of microwave energy than the patterned layer of microwave interactive material.

* * * * *